United States Patent
Bettis et al.

(10) Patent No.: US 10,282,696 B1
(45) Date of Patent: May 7, 2019

(54) AUGMENTED REALITY ENHANCED INTERACTION SYSTEM

(71) Applicant: AMAZON TECHNOLOGIES, INC., Reno, NV (US)

(72) Inventors: David William Bettis, Seattle, WA (US); Alexander Michael McNamara, Seattle, WA (US); Benjamin Ralph Hollis, Seattle, WA (US); Félix Joseph Étienne Pageau, Seattle, WA (US); Sridhar Boyapati, Sammamish, WA (US); Korwin Jon Smith, Seattle, WA (US); Jack Bradley Jones, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/298,761

(22) Filed: Jun. 6, 2014

(51) Int. Cl.
*G06Q 20/20* (2012.01)
*G06Q 10/00* (2012.01)
*G06Q 10/08* (2012.01)

(52) U.S. Cl.
CPC ..... *G06Q 10/087* (2013.01); *G06Q 10/08355* (2013.01)

(58) Field of Classification Search
CPC .... G06Q 10/087; G06Q 20/203; G06Q 20/20; G02B 27/017; G02B 27/0172; G06F 15/16; G06F 3/00; G06F 3/048; G06T 19/00
USPC ................ 705/28, 23; 345/8, 633; 709/206; 342/147
See application file for complete search history.

(56) References Cited

U.S. PATENT DOCUMENTS

| | | | |
|---|---|---|---|
| 6,176,837 B1* | 1/2001 | Foxlin | G01C 21/165 128/897 |
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,179,604 B1* | 5/2012 | Prada Gomez et al. | 359/630 |
| 8,189,855 B2 | 5/2012 | Opalach et al. | |
| 8,558,759 B1* | 10/2013 | Prada Gomez et al. | 345/7 |
| 8,630,924 B2 | 1/2014 | Groenevelt et al. | |
| 8,896,992 B2* | 11/2014 | Sherlock | G06F 1/163 361/679.03 |
| 9,007,473 B1* | 4/2015 | Worley, III | G06T 19/00 348/211.11 |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013], Retrieved from the Internet: <URL:http://citeseerx.ist.psu.edu/viewdoc/summary?doi=10.1.1.127.3033>.

(Continued)

*Primary Examiner* — Oluseye Iwarere
(74) *Attorney, Agent, or Firm* — Lindauer Law, PLLC

(57) ABSTRACT

Described are systems and techniques configured to present information to a user of a materials handling facility storing items in inventory locations. A device such as a head-mounted display or a tablet computer is configured to provide an augmented reality user interface in which computer-generated data overlays objects in the real-world. The user interface may present information associated with assisting other users of the facility, operation of the facility, and so forth.

21 Claims, 12 Drawing Sheets

(56) References Cited

U.S. PATENT DOCUMENTS

| | | | |
|---|---|---|---|
| 9,035,874 B1* | 5/2015 | Fowers | G06F 3/013 345/156 |
| 9,053,483 B2* | 6/2015 | Geisner | G06Q 30/00 |
| 9,235,928 B2 | 1/2016 | Medioni et al. | |
| 9,448,079 B2* | 9/2016 | Beaurepaire | G01C 21/34 |
| 9,891,058 B2* | 2/2018 | Beaurepaire | G01C 21/34 |
| 2002/0074370 A1* | 6/2002 | Quintana et al. | 224/262 |
| 2004/0119662 A1* | 6/2004 | Dempski | 345/8 |
| 2009/0013052 A1* | 1/2009 | Robarts | G06F 17/30867 709/206 |
| 2011/0011936 A1 | 1/2011 | Morandi et al. | |
| 2011/0201362 A1* | 8/2011 | Bregman-Amitai | G06T 19/006 455/466 |
| 2011/0213664 A1* | 9/2011 | Osterhout et al. | 705/14.58 |
| 2012/0069131 A1* | 3/2012 | Abelow | 348/14.01 |
| 2012/0075168 A1* | 3/2012 | Osterhout et al. | 345/8 |
| 2012/0184367 A1* | 7/2012 | Parrott | G06F 1/163 463/31 |
| 2012/0212398 A1* | 8/2012 | Border et al. | 345/8 |
| 2012/0212406 A1* | 8/2012 | Osterhout et al. | 345/156 |
| 2012/0218172 A1* | 8/2012 | Border et al. | 345/8 |
| 2012/0218253 A1* | 8/2012 | Clavin | G02B 27/0093 345/419 |
| 2012/0218301 A1* | 8/2012 | Miller | 345/633 |
| 2012/0284132 A1 | 11/2012 | Kim et al. | |
| 2012/0327196 A1* | 12/2012 | Ohba | G06K 9/00281 348/49 |
| 2013/0042296 A1* | 2/2013 | Hastings | G06F 21/10 726/1 |
| 2013/0127980 A1* | 5/2013 | Haddick et al. | 348/14.08 |
| 2013/0284806 A1* | 10/2013 | Margalit | 235/382 |
| 2014/0022402 A1* | 1/2014 | Mishra | H04N 5/23222 348/207.11 |
| 2014/0052555 A1* | 2/2014 | MacIntosh | G06Q 20/208 705/23 |
| 2014/0098128 A1* | 4/2014 | Fein | G06F 3/011 345/633 |
| 2014/0104034 A1* | 4/2014 | Ambrefe, Jr. | G07C 9/00087 340/4.4 |
| 2014/0118159 A1* | 5/2014 | Fish | G08C 17/02 340/870.01 |
| 2014/0199946 A1* | 7/2014 | Flippo | H04B 17/0085 455/67.14 |
| 2014/0207614 A1* | 7/2014 | Ramaswamy | G06Q 30/0613 705/26.41 |
| 2014/0267400 A1* | 9/2014 | Mabbutt | G06T 19/006 345/633 |
| 2014/0277615 A1* | 9/2014 | Nixon | G05B 11/01 700/83 |
| 2014/0282015 A1* | 9/2014 | Nixon | G05B 11/01 715/733 |
| 2014/0365334 A1* | 12/2014 | Hurewitz | G06Q 30/0613 705/26.41 |
| 2014/0368336 A1* | 12/2014 | Felix | H04W 4/008 340/539.13 |
| 2014/0368980 A1* | 12/2014 | Nanavati | G06F 1/163 361/679.03 |
| 2015/0086107 A1 | 3/2015 | Dedeoglu et al. | |
| 2015/0091780 A1* | 4/2015 | Lyren | G02B 27/017 345/8 |
| 2015/0097719 A1* | 4/2015 | Balachandreswaran | G01B 11/002 342/147 |
| 2015/0179050 A1* | 6/2015 | Katingari | G08B 25/10 340/539.13 |
| 2015/0235474 A1* | 8/2015 | Mullins | G06T 19/006 345/419 |
| 2015/0262428 A1* | 9/2015 | Tatzgern | G06T 19/006 345/633 |
| 2015/0309629 A1* | 10/2015 | Amariutei | G06F 3/0412 345/173 |
| 2015/0323986 A1* | 11/2015 | Frank | G06F 17/28 713/323 |
| 2015/0347738 A1* | 12/2015 | Ulrich | G06F 21/35 726/17 |
| 2015/0362733 A1* | 12/2015 | Spivack | A63F 13/26 345/633 |
| 2016/0026253 A1* | 1/2016 | Bradski | G02B 6/34 345/8 |
| 2016/0132046 A1* | 5/2016 | Beoughter | G06F 17/30554 700/17 |
| 2016/0227361 A1* | 8/2016 | Booth | G08B 21/0446 |
| 2016/0231122 A1* | 8/2016 | Beaurepaire | G01C 21/34 |
| 2016/0260067 A1* | 9/2016 | Holman | G06Q 20/0855 |
| 2016/0321901 A1* | 11/2016 | Desoyza | A61B 5/747 |
| 2016/0356612 A1* | 12/2016 | Beaurepaire | G01C 21/34 |

OTHER PUBLICATIONS

Kalnikaite, et al., "How to Nudge in Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011, Retrieved from Internet: <URL:http://www.researchgate.net/publication/221568350_How_to_nudge_in_Situ_designing_lambent_devices_to_deliver_salient_information_in_supermarkets>.

Pop, Christian, "Introduction to the BodyCom Technology", AN1391, DS01391A, Microchip Technology, Inc., May 2, 2011.

\* cited by examiner

AUGMENTED REALITY ENHANCED INTERACTION SYSTEM

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers and the like. In each instance, for an item to be moved from one location to another, it is picked from its current location and transitioned to a new location. It is often desirable to provide to users information associated with the items in inventory, information about other users, or other information about operation of the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
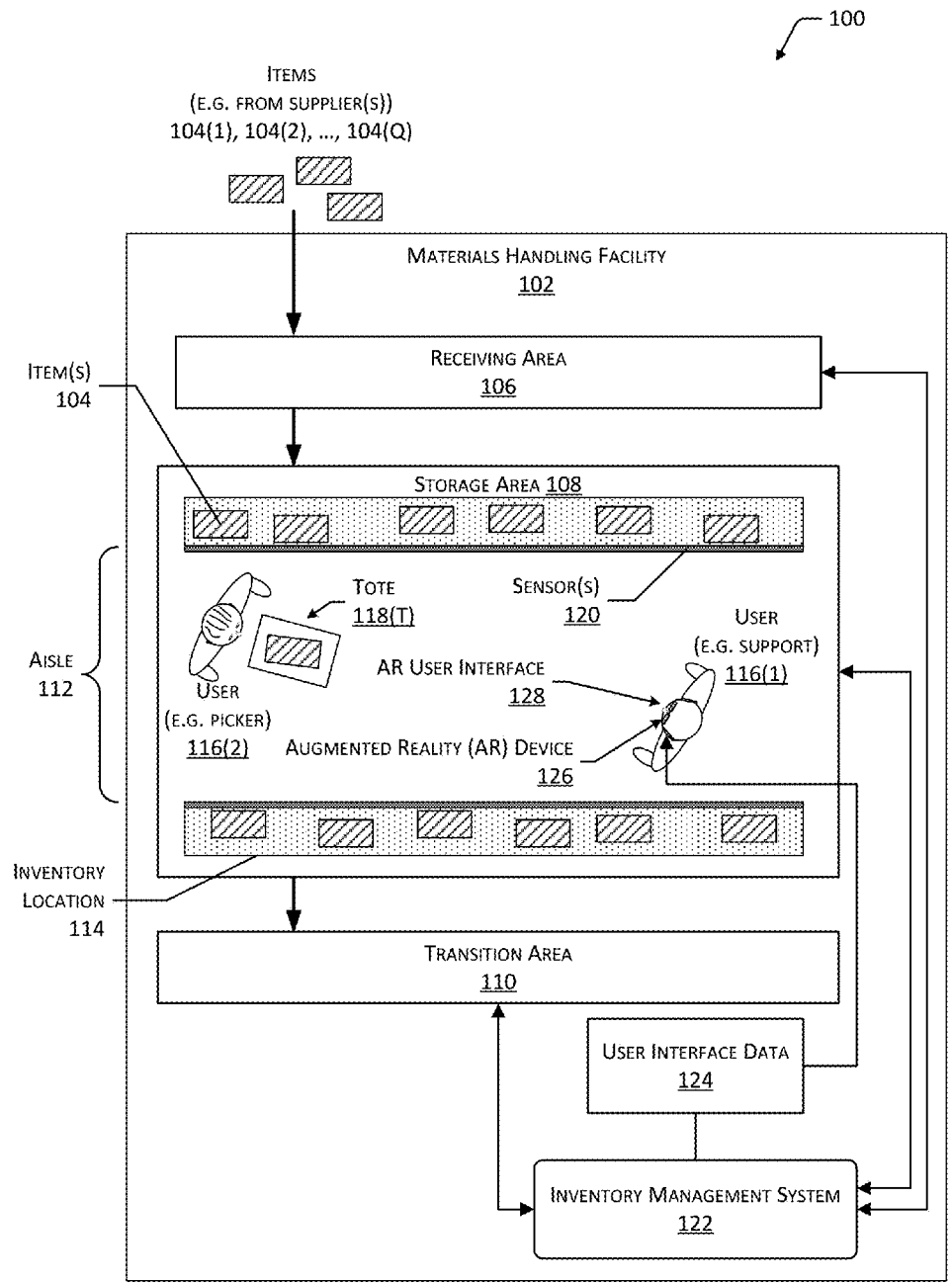
FIG. 1 is a block diagram illustrating a materials handling facility ("facility") configured to provide an augmented reality (AR) user interface, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for providing information to a user of a materials handling facility (facility). The facility may include, or have access to, an inventory management system. The inventory management system may be configured to maintain information about items, users, condition of the facility, and so forth. For example, the inventory management system may maintain operational data indicative of what items a particular user is ordered to pick, location of the particular user, availability of a user providing support services to others, requests for assistance, environmental status of the facility, and so forth.

The systems and techniques described in this disclosure may be used to generate an augmented reality (AR) user interface for presentation of the operational data or information based thereon. The augmented reality (AR) user interface may be presented using a wearable computing device, a tablet computing device, and so forth. For example, the AR user interface may present to a user (who is tasked with performing support functions) information about requests for service, location of the users being assisted, inventory status, condition of the facility, and so forth.

The AR user interface comprises one or more of visible, audible, or haptic elements which are presented to the user in such a way as to overlay real-world objects within a field of view of, or otherwise perceptible by, a user. The visible elements may include graphical representations such as icons, images, video, graphs, text, and so forth. For example, the visible elements may include bounding boxes or other polygons which appear to be arranged around the real-world object about which information is being presented. The visible elements may also include text, which may appear to be free floating, or presented on a real-world object such as a wall, floor, inventory location, or within a text box in the user's field of view. In some implementations, the overlay may be opaque or transparent. For example, a transparent overlay may allow the user to see the information presented while also seeing at least some of the real-world objects. The audible elements may include sounds which are presented such that they appear to be emanating from a particular point in space relative to the user, such as to the front, to the left, and so forth.

The elements used to present information in the AR user interface may be representative of, or based at least in part on, operational data. The inventory management system is configured to generate operational data based at least in part on sensor data acquired by one or more sensors in the facility. The sensors may include imaging sensors, radio frequency identification readers, weight sensors, and so forth. The operational data provides information about the users of the facility, inventory, status of the facility, and so forth. For example, operational data may include information facility data, item data, or user data. The facility data is information indicative of the facility, such as status of a fire alarm, condition of emergency exits, environmental data such as temperature and humidity, and so forth. The item data provides information about the items stored in the facility, such as item location, item quantity, order data, and so forth. The user data provides information such as demographic data about the user, location data within the facility, relationships with other users, messages for the user, navigation paths through the facility, access permissions, and so forth. Individual users or groups of users may selectively provide user data for use by the inventory management system, or may authorize collection of the user data during use of the facility or access to user data obtained from other systems. For example, a user may opt-in to collection of the user data to receive enhanced services while using the facility.

In one implementation, images acquired by the imaging sensor may be analyzed by the inventory management system to determine an identity and a location of a first user. This information may then be presented using the AR user interface to a second user. For example the first user may request assistance, the second user may see presented in an AR user interface of their wearable computing device an indication of the request. Continuing the example, the AR user interface may also present additional information, such as the elapsed time since the request was made.

In another example, the location of the first user within the facility may be presented in their AR user interface visible to the second user. Furthermore other information such as details about the first user may also be presented to the second user by way of the AR user interface. In this way, the inventory management system supports the operation of the facility by providing information and directions to the second user.

The facility may service a number of users simultaneously. In this situation, the AR user interface may be configured to selectively display information based on one or more criteria. In one implementation, the AR user interface may be configured to present information based at least in part on a distance between users. For example, a first set of information comprising a graphical indicator of the first user's location may be presented in the AR user interface when the second user is on the opposite side facility. Continuing the example, as the distance between the first user and the second user decreases, a second set of information comprising text descriptive and other details may be presented. Thus, as the second user approaches the first user, additional information in the AR user interface is presented.

The information presented in the AR user interface may also be based at least in part on the access permissions associated with the user. For example, the first user or the second user may have access permissions which restrict retrieval or presentation of information to particular users or groups of users.

The facility may include a materials handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein enable information to be presented in an AR user interface in a way which is meaningful, unobtrusive, and responsive to the user. The AR user interface may improve overall operation of the inventory management system, improve the experience of the users, and so forth.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), . . . , 116(U) and totes 118(1), 118(2), 118, . . . , 118(T) or other material handling apparatus may move within the facility 102. For example, the user 116 may move about within the facility 102 to pick or place the items 104 in various inventory locations 114, placing them on the tote 118 for ease of transport. In other implementations, other agencies such as robots, forklifts, cranes, aerial drones, and so forth, may move about the facility 102 picking, placing, or otherwise moving the items 104.

The one or more users 116 may play different roles in the operation of the facility 102. For example, some users 116 may be tasked with picking or placing items 104 while other users 116 support the operation of the facility 102 by assisting other users 116. Furthermore, the roles of a particular user 116 may change over time. For example, the user 116(1) may start out as an assistant and later be tasked as a supervisor.

One or more sensors 120 may be configured to acquire information in the facility 102. The sensors 120 may include, but are not limited to, imaging sensors, weight sensors, radio frequency (RF) receivers, temperature sensors, humidity sensors, vibration sensors, and so forth. The sensors 120 may be stationary or mobile, relative to the facility 102. For example, the inventory locations 114 may contain imaging sensors configured to acquire images of pick or placement of items 104 on shelves. In another example, the floor of the facility 102 may include weight sensors configured to determine a weight of the user 116 or other object thereupon. The sensors 120 are discussed in more detail below with regard to FIG. 2.

During operation of the facility 102, the sensors 120 may be configured to provide information suitable for tracking how objects move within the facility 102. For example, a series of images acquired by an imaging sensor may indicate removal of an item 104 from a particular inventory location 114 by the user 116 and placement of the item 104 on or at least partially within the tote 118. The tote 118 is discussed in more detail below with regard to FIG. 4.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 are depicted functionally rather than schematically. For example, in some implementations multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at receiving area 106, the items 104 may be prepared for storage. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

During use of the facility 102, the user 116 may move about the facility 102 to perform various tasks, such as picking or placing the items 104 in the inventory locations 114. The user 116 may benefit from presentation of information about the items 104, such as a SKU, item name, description, packaging information, and so forth. Other users 116 may benefit from presentation of information about the status of the facility 102, request for assistance made by other users 116, and so forth.

The inventory management system 122 is configured to generate user interface data 124. The user interface data 124 may comprise commands, instructions, tags, markup language, images, color values, text, or other data. For example, the user interface data 124 may be expressed as hypertext markup language (HTML), cascading style sheets (CSS), JavaScript, and so forth. One or more augmented reality (AR) devices 126 are configured to use the user interface data 124 to present an AR user interface 128 which may be perceived by the user 116. The AR user interface 128 may include one or more elements including visual, haptic, audible, olfactory, and so forth. For example, the AR devices 126 may process the instructions in the user interface data 124 and display corresponding elements such as text, shapes, icons, and so forth. The AR devices 126 are discussed in more detail below with regard to FIG. 5.

The inventory management system 122 may access or generate operational data about the facility 102 and the contents therein including the items 104, the users 116, the totes 118, and so forth. The operational data may be based on sensor data acquired by one or more of the sensors 120, data provided by other systems, and so forth. The operational data is discussed below in more detail with regard to FIG. 3. In one implementation, operational data indicative of a location of the user 116 may be based at least in part on image data acquired by one or more imaging sensors.

The inventory management system 122 generates the user interface data 124 based on the operational data. For example, the user interface data 124 may comprise HTML, CSS, and information indicating a particular AR device 126 associated with a particular user 116. The particular AR device 126 may present the resulting AR user interface 128 to the particular user 116. The presentation may be such that, as the user 116(1) approaches another user 116(2), additional information appears in the AR user interface 128 about the user 116(1).

In some implementations the changes to the AR user interface 128 may be responsive to inputs which change over time, or may include predicted data. For example, the operational data may be updated by ongoing sensor data acquired using the one or more sensors 120 which may be used to update the AR user interface 128 in real-time or near-real-time based on the movement of the user 116(1). In another example, the AR user interface 128 may present to the user 116(1) a predicted navigation path through the facility 102 of the user 116(2) to enable the user 116(1) to join the user 116(2).

The inventory management system 122 may thus be configured to determine what information is presented, when the information is presented, how the information is presented, or other aspects of the AR user interface 128 responsive to the operational data or other inputs. The resulting AR user interface 128 may improve the experience of the user 116(1) in the facility 102 by providing unobtrusive access to useful information associated with operating the facility 102. The AR user interfaces 128 are discussed below with regard to FIGS. 7-9.

Figure 2:
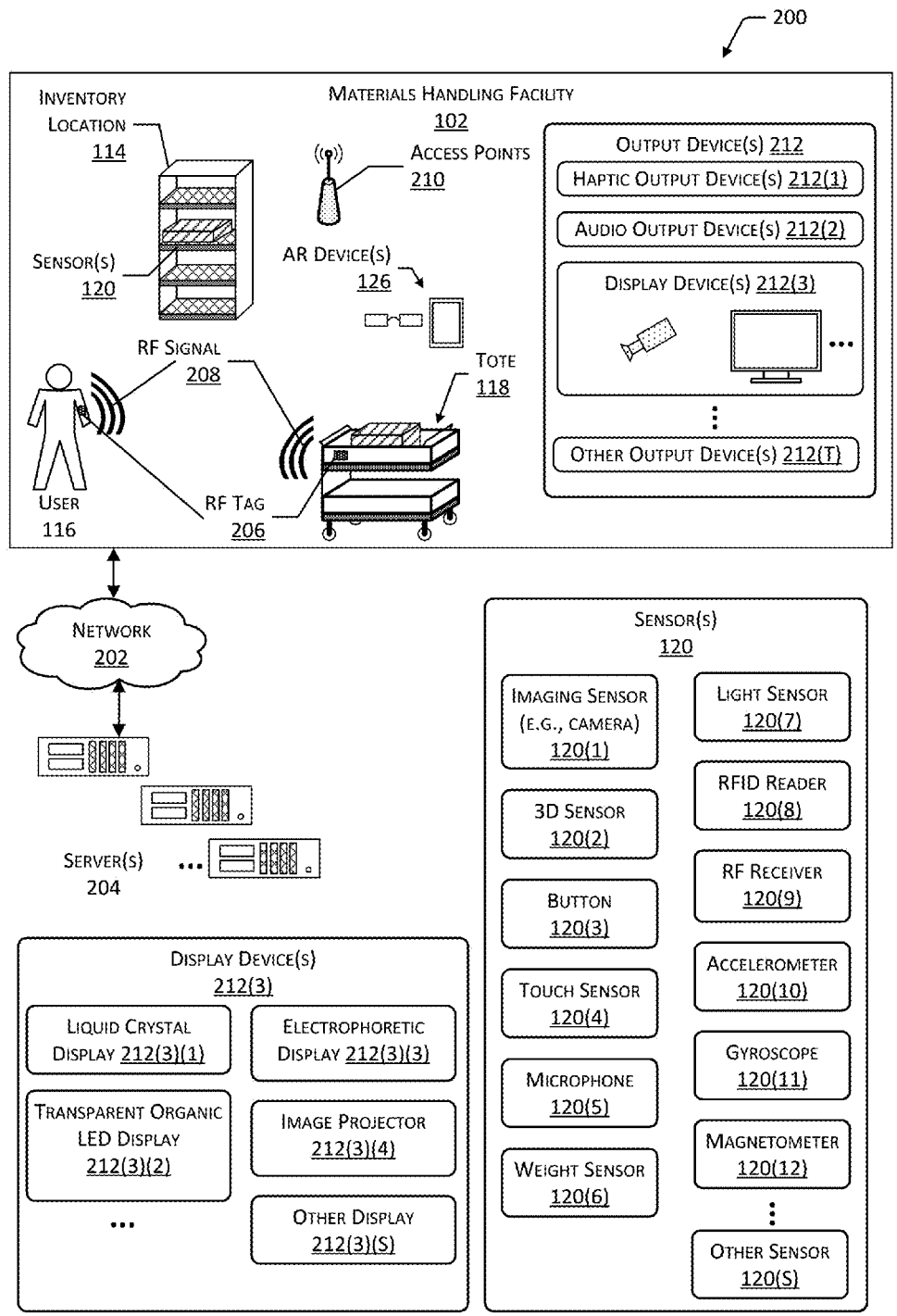
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122. While the servers 204 are illustrated as being in a location outside of the facility 102, in other implementations at least a portion of the servers 204 may be located at the facility 102. The servers 204 are discussed in more detail below with regard to FIG. 3.

The users 116, the totes 118, or other objects in the facility 102 may be equipped with one or more radio frequency (RF) tags 206. The RF tags 206 are configured to emit an RF signal 208. In one implementation, the RF tag 206 may be a radio frequency identification (RFID) tag configured to emit the RF signal 208 upon activation by an external signal. For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal.

The inventory management system 122 may be configured to use the RF tags 206 for one or more of identification of the object, determining a location of the object, and so forth. For example, the users 116 may wear RF tags 206, the totes 118 may have RF tags 206 affixed, and so forth which may be read and, based at least in part on signal strength, used to determine identity and location. The tote 118 is configured to carry or otherwise transport one or more items 104. For example, the tote 118 may include a basket, a cart, a bag, and so forth. The tote 118 is discussed in more detail below with regard to FIG. 4.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote 118, in the AR device 126, may be carried or worn by the user 116, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, and so forth based at least in part on their appearance within the image data.

One or more 3D sensors 120(2) may also be included in the sensors 120. The 3D sensors 120(2) are configured to acquire spatial or three-dimensional data, such as depth information, about objects within a sensor field-of-view. The 3D sensors 120(2) include range cameras, lidar systems, sonar systems, radar systems, structured light systems, stereo vision systems, optical interferometry systems, and so forth. The inventory management system 122 may use the acquired three-dimensional data to identify objects, determine a location, orientation, or position of an object, and so forth. For example, the inventory management system 122 may determine operational data such as location in the facility 102 of the user 116 based at least in part on the location in three-dimensional space of the user 116.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) configured such that the button 120(3) may be activated by the user 116(2). The inventory management system 122 may use this information to summon assistance from the user 116(1) or other users 116 designated to support the facility. The assistance may be summoned by providing user interface data 124 to the AR device 126 of the user 116(1), such that a prompt or other indicia is presented to the user 116(1).

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire information indicative of sound present in the environment. In some implementations arrays of microphones 120(5) may be used. These arrays may implement beam-forming techniques to provide for directionality of gain. The inventory management system 122 may use the one or more microphones 120(5) to acquire information from acoustic tags, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers which generate one or more signals based on an applied force, such as that of the load due to gravity. The inventory management system 122 may use the data acquired by the weight sensors 120(6) to identify an object, determine a location of an object, maintain shipping records, and so forth. For example, given a known weight of an item 104(1) at 1.234 kg the inventory management system 122 may be configured to use the weight of 1.234 kg added to the tote 118 to infer the item 104(1) has been added. Weight data acquired from weight sensors 120(6) may be used to track and identify movement of items 104 from one location to another. For example, weight sensors 120(6) of the inventory location 114(1) may detect the decrease in weight of 1.234 kg, while the weight sensors 120(6) of the tote 118 detect the increase. Based on the previously stored weight data and the movement of this weight value from one location to another, the inventory management system may determine that the item 104(1) has been moved from the inventory location 114(1) to the tote 118. In situations where weights of different items 104 are the same or within a range of values, other information may be used to disambiguate the item 104. For example, information such as location of the weight sensors 120(6) in the facility, image data showing where the user 116 has picked the item 104 from, RFID tag data, optical tag data, and so forth may be used. Optical tags may include, but are not limited to, barcodes, glyphs, colors, color patterns, and so forth. For example, the optical tag may comprise machine- and human-readable text, or a machine-readable two-dimensional barcode.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of the AR user interface 128.

One more radio frequency identification (RFID) readers 120(8), near field communication (NFC) systems, and so forth may also be provided in the sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth. For example, based on information from the RFID readers 120(8), a velocity of the RF tag 206 may be determined and used as kinematic data.

One or more RF receivers 120(9) may also be provided. In some implementations the RF receivers 120(9) may be part of transceiver assemblies. The RF receivers 120(9) may be configured to acquire RF signals 208 associated with Wi-Fi, Bluetooth, ZigBee, 3G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source such as the AR device 126.

The sensors 120 may include one or more accelerometers 120(10), which may be worn or carried by the user 116, mounted to the tote 118, and so forth. The accelerometers 120(10) may provide information such as the direction and magnitude of an imposed acceleration. Operational data such as rate of acceleration, determination of changes in direction, speed, and so forth may be determined using the accelerometers 120(10).

A gyroscope 120(11) provides information indicative of rotation of an object affixed thereto. For example, the tote 118, the AR device 126, or other objects may be equipped with a gyroscope 120(11) to provide operational data indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, the AR device 126, and so forth. For example, the magnetometer 120(12) in the AR device 126 as worn by the user 116(1) may act as a compass and provide information indicative of which way the user 116(1) is facing.

The sensors 120 may include other sensors 120(S) as well. For example, the other sensors 120(S) may include proximity sensors, ultrasonic rangefinders, thermometers, barometric sensors, hygrometers, or biometric input devices including but not limited to fingerprint readers or palm scanners. For example, the inventory management system 122 may use information acquired from thermometers and hygrometers in the facility 102 to modify the AR user interface 128 to direct the user 116 to check on delicate items 104 stored in a particular inventory location 114.

The facility 102 may include one or more access points 210 configured to establish one or more wireless networks. The access points 210 may use Wi-Fi, near field communication (NFC), Bluetooth, or other technologies to establish wireless communications between a device and the network 202. The wireless networks allow the devices to communicate with one or more of the inventory management system 122, the sensors 120, the AR devices 126, the RF tag 206, a communication device of the tote 118, or other devices.

Output devices 212 may also be provided in the facility 102. The output devices 212 are configured to generate signals which may be perceived by the user 116.

Haptic output devices 212(1) are configured to provide a signal which results in a tactile sensation of the user 116. The haptic output devices 212(1) may use one or more mechanisms such as electrical stimulation or mechanical displacement to provide the signal. For example, the haptic output devices 212(1) may be configured to generate a modulated electrical signal which produces an apparent tactile sensation in one or more fingers of the user 116. In another example, the haptic output devices 212(1) may comprise piezoelectric or rotary motor devices configured to provide a vibration which may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to: voice coils, piezoelectric elements, magnetorestrictive elements, or electrostatic elements, and so forth. For example, a piezoelectric buzzer or a speaker may be used to provide acoustic output.

The display devices 212(3) may be configured to provide output which may be seen by the user 116, or detected by a light-sensitive detector such as an imaging sensor 120(1) or light sensor 120(7). The output may be monochrome or color. The display devices 212(3) may be emissive, reflective, or both. An emissive display device 212(3) is configured to emit light during operation. For example, a light emitting diode (LED) is an emissive visual display device 212(3). In comparison, a reflective display device 212(3) relies on ambient light to present an image. For example, an electrophoretic display is a reflective display device 212(3). Backlights or front lights may be used to illuminate the reflective visual display device 212(3) to provide visibility of the information in conditions where the ambient light levels are low.

Mechanisms of the display devices 212(3) may include liquid crystal displays 212(3) (1), transparent organic light emitting diodes (LED) 212(3) (2), electrophoretic displays 212(3) (3), image projectors 212(3) (4), or other display mechanisms 212(3) (S). The other display mechanisms 212(3) (S) may include, but are not limited to, microelectromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 212(3) may be configured to present images. For example, the display devices 212(3) may comprise a pixel-addressable display. The image may comprise at least a two-dimensional array of pixels, or a vector representation of an at least two-dimensional image.

In some implementations, the display devices 212(3) may be configured to provide non-image data, such as text characters, colors, and so forth. For example, a segmented electrophoretic display, segmented LED, and so forth may be used to present information such as a SKU number. The display devices 212(3) may also be configurable to vary the color of the text, such as using multicolor LED segments.

In some implementations, display devices 212(3) may be configurable to provide image or non-image output. For example, an electrophoretic display 212(3)(3) with addressable pixels may be used to present images of text information, or all of the pixels may be set to a solid color to provide a colored panel.

The output devices 212 may include hardware processors, memory, and other elements configured to accept and process the user interface data 124 to present the AR user interface 128 or non-AR user interfaces 128. For example, in one implementation the display devices 212(3) may be arranged along the edges of inventory locations 114 and be configured to present non-AR information such as SKUs.

Other output devices 212(T) may also be present. For example, the other output devices 212(T) may include scent/odor dispensers, document printers, three-dimensional printers or fabrication equipment, and so forth.

The inventory management system 122 may generate the user interface data 124 which is then used by the AR devices 126 to present the AR user interface 128. The AR user interface 128 may be configured to stimulate one or more senses of the user 116. For example, the AR user interface 128 may comprise visual, audible, and haptic output.

Figure 3:
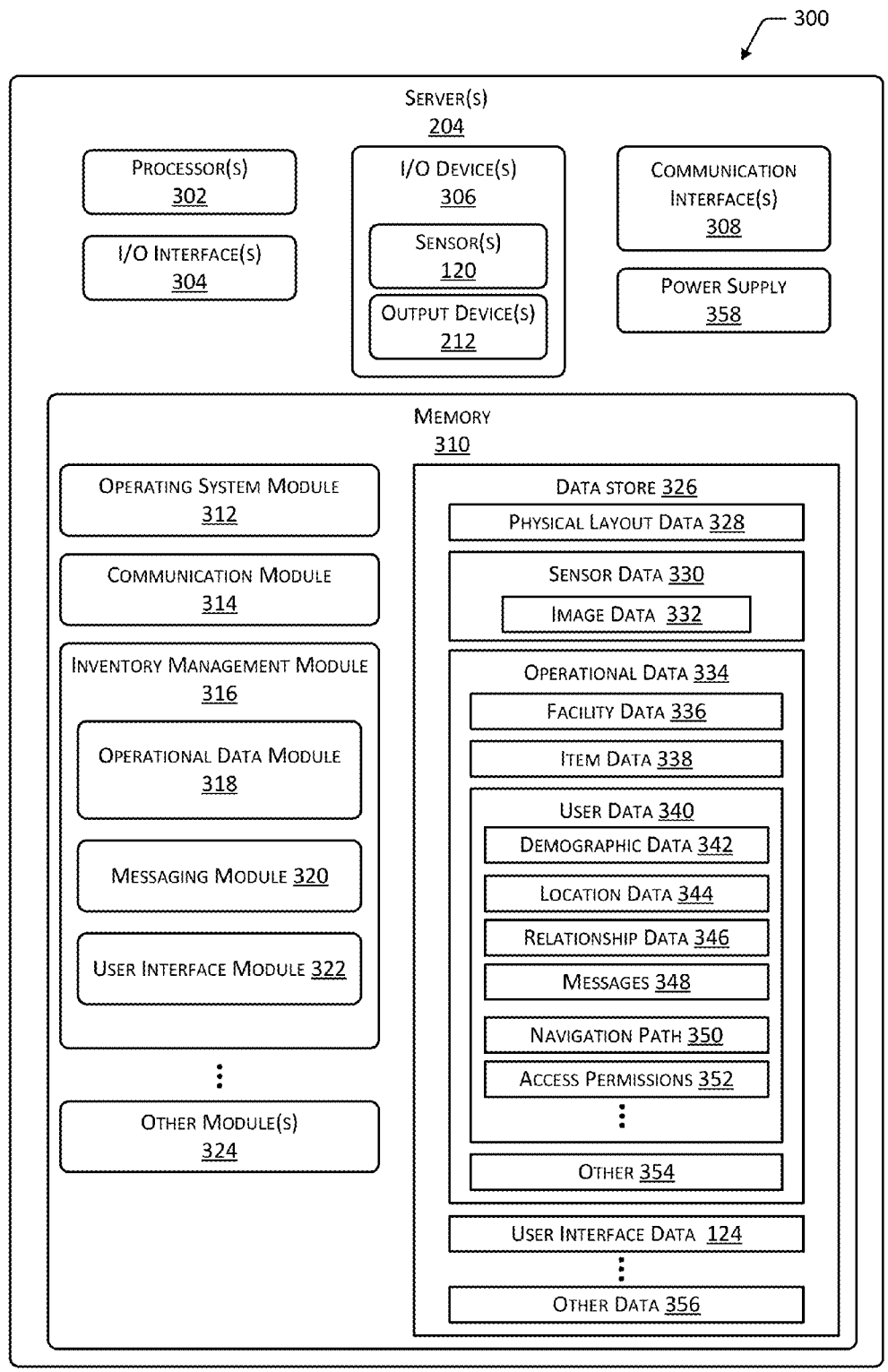
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers" and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, and so forth. The I/O devices 306 may also include output devices such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, the AR devices 126, routers, the access points 210, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project, other UNIX or UNIX-like variants, a variation of the Linux operating system as promulgated by Linus Torvalds, the Windows Server operating system from Microsoft Corporation of Redmond, Wash., and so forth.

Also stored in the memory 310 may be one or more of the following modules. These modules may be executed as foreground applications, background tasks, daemons, and so forth.

A communication module 314 may be configured to establish communications with one or more of the sensors 120, one or more of the AR devices 126, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track items 104 between different inventory locations 114, to and from the totes 118, and so forth.

The inventory management module 316 may be configured to generate the user interface data 124 which may be used by the AR device 126 to present the AR user interface 128. The inventory management module 316 may include one or more of an operational data module 318, a messaging module 320, and a user interface module 322.

The operational data module 318 is configured to generate operational data based at least in part on sensor data from the one or more sensors 120. For example, the operational data module 318 may use image data to determine one or more of location, orientation, or position of the users 116(1), 116(2), . . . , 116(U) within the facility 102. Location is where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user is facing south. Position may provide information indicative of a physical configuration of the object, such as the user 116 has their arms stretched out to either side.

The messaging module 320 is configured to support the exchange of information between users 116 in the facility 102. For example, the messaging module 320 may be used to notify users 116 who are tasked with providing support services to assemble for a meeting with their supervising user 116. In another implementation, the messaging module 320 may be used to send or receive messages between users 116 providing support services and other users 116 of the facility 102. For example, the user 116(1) may use the messaging module 320 to send a note to the user 116(2) that may have received a request for assistance and are on their way.

In one implementation, the messaging module 320 may be configured to direct a message to a particular user 116 based on one or more criteria. For example, a first request for assistance may be received with the criteria indicating the request was generated five minutes ago and involves assistance in reaching a product. A second request for assistance may be received with the criteria indicating the request was generated one minute ago and involves a dispute. The messaging module 320 may route the first request to an assistant-level support user 116(1), while routing the second request to a manager-level support user 116(3), automatically escalating the matter from an assistant-level employee to a manager tasked with resolving disputes. In another example, a request for assistance which has been unresolved for longer than a threshold length of time may be automatically escalated and delivered to the manager-level support user 116(3).

The user interface module 322 is configured to generate user interface data 124. The user interface data 124 may be based at least in part on the operational data. Other information from other systems may also be accessed. For example, information from a financial transaction processing system may be accessed and used to generate at least a portion of the operational data. As described above, the user interface data 124 is configured to provide the AR user interface 128 by way of one or more AR devices 126.

In one implementation, the user interface module 322 may configure the AR user interface 128 such that an amount of information presented is proportionate to a distance between one object and another object. For example, as the user 116(1) approaches the user 116(2), the user interface module 322 may generate user interface data 124 configured to present the AR user interface 128 on the AR device 126 of the user 116(1). The user interface data 124 includes a limited amount of information at first distance and more information at a second distance which is closer than the first. In this way, the user 116(1) is presented with information in the AR user interface 128 which varies upon how close the user 116(2) is. Similarly, as the user 116(1) moves away from the user 116(2) and the distance increases or turns away from the user 116(2), the amount of information presented may be reduced.

The user interface module 322 may configure the AR user interface 128 to provide information associated with a variety of tasks in the facility 102. These tasks may include, but are not limited to, placing inventory in the inventory locations 114, performing maintenance tasks, assisting other users 116, training, and so forth.

Other modules 324 may also be present in the memory 310. For example, an object recognition module may be configured to use data from one or more of the sensors 120 to identify an object such as the item 104, the user 116, the tote 118, and so forth.

The memory 310 may also include a data store 326 to store information. The data store 326 may use a flat file, database, linked list, tree, executable code, script, or other data structure to store the information. In some implementations, the data store 326 or a portion of the data store 326 may be distributed across one or more other devices including other servers 204, network attached storage devices and so forth.

The data store 326 may include physical layout data 328. The physical layout data 328 provides a mapping of physical locations within the physical layout of devices and objects such as the sensors 120, inventory locations 114, and so forth. For example, the physical layout data 328 may indicate the coordinates within the facility 102 of an inventory location 114, an RFID reader 120(8) close to that inventory location 114, and so forth. In some implementations, the operational data module 318 may access the physical layout data 328 to determine a distance between two objects, such as the users 116(1) and 116(2).

The data store 326 may also include sensor data 330. The sensor data 330 comprises information acquired from, or based on, the one or more sensors 120. For example, the sensor data 330 may comprise three-dimensional information about an object in the facility 102. As described above, the sensors 120 may include an imaging sensor 120(1) which is configured to acquire one or more images. These images may be stored as image data 332. The image data 332 may comprise information descriptive of a plurality of picture elements or pixels.

Operational data 334 may also be stored in the data store 326. The operational data 334 may include facility data 336, item data 338, user data 340, or other data. The facility data 336 is information indicative of the facility 102. For example, the facility data 336 may indicate alarm status, location of emergency exits, condition of emergency exits, evacuation path, environmental data such as temperature and humidity, status of lighting systems, equipment status, and so forth. The facility data 336 may thus provide information about the infrastructure of the facility 102.

The item data 338 comprises information associated with the items 104. The information may include one or more inventory locations 114, at which one or more of the items 104 are stored. The item data 338 may also include order data, SKU or other product identifier, price, quantity on hand, weight, expiration date, images of the item, detail description information, ratings, ranking, and so forth. The inventory management module 316 may store information associated with inventory management functions in the item data 338.

The user data 340 provides information about one or more of the users 116 of the facility 102. The user data 340 may include one or more of demographic data 342, location data 344, relationship data 346, messages 348, navigation paths 350, access permissions 352, and so forth. The demographic data 342 may comprise information indicative of the user's 116 skills, address, contact information, age, and so forth. The location data 344 comprises information indicative of the user's 116 location in the facility 102. In some implementations this may include predictive data, such as an estimation of when the user 116 is expected to arrive or depart the facility 102. The location data 344 may be expressed in absolute terms or relative terms. Absolute terms may comprise a latitude, longitude, and altitude with respect to a geodetic reference point. Relative terms may include a location of 25.4 m along an x-axis and 75.2 m along a y-axis is designated by a floor plan of the facility 102, 5.2 m from an inventory location 114 along the heading of 169°, and so forth.

The relationship data 346 provides information indicative of an association between the user 116 and other users or people. For example, the relationship data 346 may indicate the users 116(2)-(5) are members of the same picking shift. In another implementation, the relationship data 346 may indicate that the users 116(5) and 116(7) share a familial or marital relationship, such as being spouses or siblings. The relationship data 346 may be used by the inventory management module 316 in various ways. For example, the relationship data 346 may be accessed to prevent having related individuals crosscheck one another's picking of a high-value item 104. The relationship data 346 may be entered by the user 116, determined automatically, and so forth. The relationship data 346 may be stored and retrieved by the inventory management module 316 for later use. For example, when the users 116(5) and 116(7) enter the facility 102 at a later date, the relationship data 346 indicating their relationship may be retrieved and used.

The relationship data 346 may be determined automatically using one or more of the following techniques. A first technique analyzes the image data 332 acquired at an entry portal of the facility 102 to determine the first user 116(2) was proximate to the one or more additional users 116(U) at the entry portal. For example, the image data 332 may capture an image of a husband and wife entering the facility 102 walking side-by-side. Proximity between the users 116 may be determined using stadiametric techniques, pixel counts, and so forth. For example, a proximity threshold may specify that the user 116(2) having an edge of their body within 30 pixels of another user 116(U) are deemed related.

A second technique to determine relationship data 346 may use sensor data 330 from non-imaging sensors 120. In one implementation, an RFID reader 120(8) may be located to scan and detect RF tags 206 at the entry portal. The RF tag values and timestamps indicative of when the RF tag 206 was detected may be stored and processed. Based on two or more tags being within a threshold time of one another, the users 116 associated with those tags may be associated by way of relationship data 346. For example, the threshold time may be 2 seconds, thus RF tags 206 scanned within 2 seconds of one another may be deemed "related". The RF tag values may be used to retrieve identities of the particular users 116 carrying the RF tags 206. The identified users 116 may be associated with one another, with this association stored as the relationship data 346. An analogous process may use other tags, such as optical tags, acoustic tags, and so forth.

The messages 348 may include information to or from one or more of the users 116. For example, the messages 348 may include a request for assistance from the user 116(2), a message such as a request for a team meeting by a supervisor user 116, and so forth. The messages 348 may be presented to the recipient user 116 using visual, audible, or haptic output. For example, a request for assistance message 348 as initiated by the user 116(1) or the inventory management module 316 may be presented to the user 116(2) in the AR user interface 128 as an icon or an audio prompt.

The navigation path 350 provides information indicative of an actual, scheduled, or predicted path of the user 116 through the facility 102. For example, the historical navigation path 350 may comprise a set time series of points of the user 116 within the facility 102 over a period of elapsed time. The historical navigation path 350 provides information showing where the user 116 has been within the facility 102.

Scheduled navigation path 350 provides information as to what path the user 116 is being directed to follow through the facility 102. For example, the scheduled navigation path 350 may be generated using a list of items 104 to be picked by the user 116. Based at least in part on the physical arrangement of the inventory locations 114 associated with those items 104 in the order as retrieved from the physical layout data 328, a picking path may be specified. In some implementations, the scheduled navigation path 350 may also comprise a time series indicating estimated locations within the facility 102 at particular times. The routing of the scheduled navigation path 350 may be configured to optimize one or more parameters of the user's 116 travel through the facility 102. For example, the scheduled navigation path 350 may be configured to minimize walk distance, reduce congestion at a particular inventory location 114 relative to other users 116, minimize use of other material handling equipment such as pallet jacks or forklifts, and so forth.

Predicted navigation path 350 provides an estimation as to what path the user 116 will follow through the facility 102 prospectively. In some implementations, the predicted navigation path 350 may also comprise a time series indicating estimated locations within the facility 102 at particular times. For example, the predicted navigation path 350 may be based on the historical navigation path 350 of one or more users 116. Continuing the example, the historical navigation path 350 may indicate that a significant percentage of the users 116 that have gone past a particular aisle 112, enter that aisle 112 even when no items 104 within the aisle 112 are scheduled for picking. In this example, predicted navigation path 350 for a particular user 116 may include the assumption that this particular user 116 will also enter that aisle 112.

In some implementations, certain portions of the facility 102 may be blacked out such that location data 344 is not collected, or may have navigation path 350 associated with those portions redacted from the navigation path 350. For example, movements within a break room or a restroom are not tracked.

The operational data 334 may also include access permissions 352. The access permissions 352 specify what information may be retrieved by, or made accessible to, a particular user 116 or group of users 116. For example, the user 116(1) may be assigned access permissions 352 commensurate with their responsibilities as a supervisor. These access permissions 352 may allow the supervisor user 116(1) to see detailed information about the tasks currently being performed by other users 116. In another example, the access permissions 352 may specify limits as to which users 116 may send or receive messages 348 to other users 116. For example, the supervisor user 116 may be permitted to send messages 348 to all users 116 in the facility, while nonsupervisory users 116 may be permitted to send messages 348 only to other support users including supervisors. The access permissions 352 may be specified in terms of which users 116 may retrieve operational data 334, what operational data 334 the particular user 116 chooses to allow others to access, or a combination thereof.

Individual users 116 or groups of users 116 may selectively provide user data 340 for use by the inventory management system 122, or may authorize collection of the user data 340 during use of the facility 102 or access to user data 340 obtained from other systems. For example, a user 116 may opt-in to collection of the user data 340 to receive enhanced services while using the facility 102.

The operational data 334 may also include other data 354. For example, the other data 354 may include information indicative of a determination that assistance is to be provided to one or more of the users 116, elapsed time since the determination assistance is to be provided, weather information, user preferences, loading dock status, tote 118 availability, and so forth.

As described above, the user interface data 124 may comprise commands, instructions, tags, markup language, images, color values, or other data. For example, the user interface data 124 may comprise one or more files including HTML, CSS, or JavaScript components.

The data store 326 may store other data 356 as well, such as user preferences, configuration files, and so forth.

The server 204 may also include a power supply 358. The power supply 358 is configured to provide electrical power suitable for operating the components in the server 204.

Figure 4:
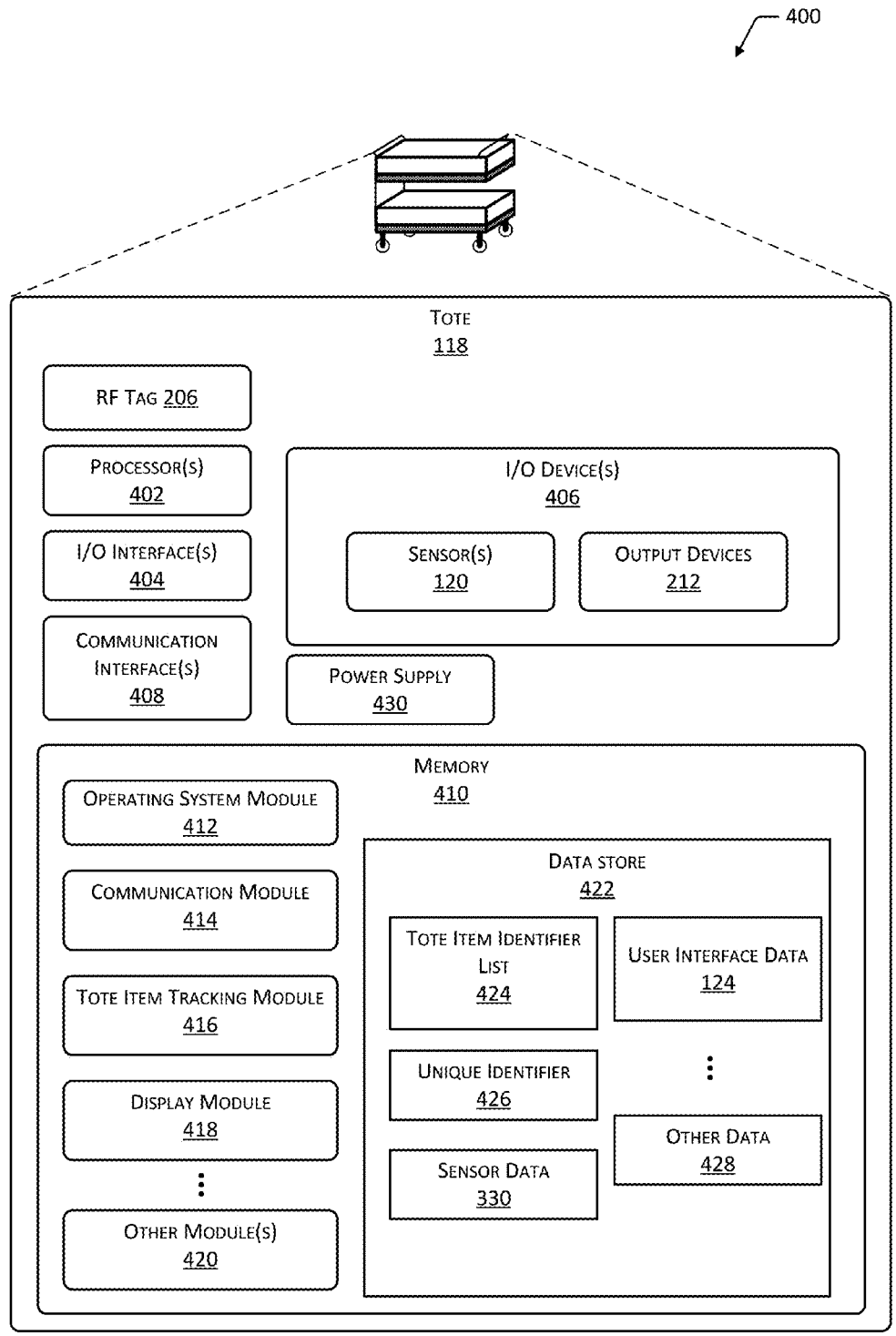
FIG. 4 is a block diagram of a tote, according to some implementations.

FIG. 4 illustrates a block diagram 400 of the tote 118, according to some implementations. The tote 118 may include an RF tag 206. The RF tag 206 may be affixed to, integral with, or is otherwise associated with the tote 118. In some implementations, the tote 118 may have identifiers, tags, or other indicia thereupon. For example, a machine-readable optical code, such as a barcode, may be affixed to a side of the tote 118.

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include imaging sensors 120(1), weight sensors 120(6), RFID readers 120(8), and so forth. The I/O devices 406 may also include output devices 212 such as haptic output devices 212(1), audio output devices 212(2), display devices 212(3), and so forth. In some implementations input and output devices may be combined. For example, a touchscreen display may incorporate a touch sensor 120(4) and a display device 212(3). In some embodiments, the I/O devices 406 may be physically incorporated with the tote 118 or may be externally placed.

The tote 118 may also include one or more communication interfaces 408. The communication interfaces 408 are configured to provide communications between the tote 118 and other devices, such as other totes 118, AR devices 126, routers, access points, the servers 204, and so forth. The communication interfaces 408 may include devices configured to couple to PANs, LANs, WANs, and so forth. For example, the communication interfaces 408 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above. The memory 410 provides storage of computer readable instructions, data structures, program modules and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD operating system as promulgated by the FreeBSD Project, other UNIX or UNIX-like variants, a variation of the Linux operating system, such as Android as promulgated by Google, Inc. of Mountain View, Calif. Other OS modules 412 may be used, such as the Windows operating system from Microsoft Corporation of Redmond, Wash., the LynxOS from LynuxWorks of San Jose, Calif., and so forth.

Also stored in the memory 410 may be one or more of the following modules. These modules may be executed as foreground applications, background tasks, daemons, and so forth.

A communication module 414 may be configured to establish communications with one or more of the sensors 120, AR devices 126, the servers 204, or other devices. The communications may be authenticated, encrypted, and so forth.

The memory 410 may also store a tote item tracking module 416. The tote item tracking module 416 is configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 120(6) and an RFID or NFC reader 120(8). The tote item tracking module 416 may send the list of items 104 to the inventory management system 122. The tote item tracking module 416 may also be configured to receive information from the inventory management system 122. For example, a list of items 104 to be picked may be presented within a user interface 124 on the display device 212(3) of the tote 118.

The memory 410 may include a display module 418. The display module 418 may be configured to present information, such as received from the one or more servers 204 or generated onboard the tote 118, using one or more of the output devices 212.

Other modules 420 may also be stored within the memory 410. In one implementation, a data handler module may be configured to generate operational data 334 indicative of the user 116, the tote 118, or another one or more objects in range of the sensors 120 of the tote 118. For example, the data handler module may be configured to acquire data from one or more speed sensors 120 and provide that sensor data 330 to the operational data module 318 of the server 204.

The other modules 420 may also include a user authentication module which may be configured to receive input and authenticate or identify a particular user 116. For example, the user 116 may enter a personal identification number or may provide a fingerprint to the fingerprint reader to establish their identity.

The memory 410 may also include a data store 422 to store information. The data store 422 may use a flat file, database, linked list, tree, executable code, script, or other data structure to store the information. In some implementations, the data store 422 or a portion of the data store 422 may be distributed across one or more other devices including the servers 204, other totes 118, network attached storage devices and so forth.

The data store 422 may store a tote item identifier list 424. The tote item identifier list 424 may comprise data indicating one or more items 104 associated with the tote 118. For example, the totem item identifier list 424 may indicate the items 104 which are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable non-volatile memory, such as a programmable read-only memory (PROM). In some implementations, the unique identifier 426 may be part of a communication interface 408. For example, the unique identifier 426 may comprise a media access control address associated with a Bluetooth interface.

The data store 422 may also store sensor data 330. The sensor data 330 may be acquired from the sensors 120 onboard the tote 118. The user interface data 124 received by the tote 118 may also be stored in the data store 422.

Other data 428 may also be stored within the data store 422. For example, tote configuration settings, user interface preferences, and so forth may also be stored.

The tote 118 may also include a power supply 430. The power supply 430 is configured to provide electrical power suitable for operating the components in the tote 118. The power supply 430 may comprise one or more of photovoltaic cells, batteries, wireless power receivers, fuel cells, capacitors, and so forth.

Figure 5:
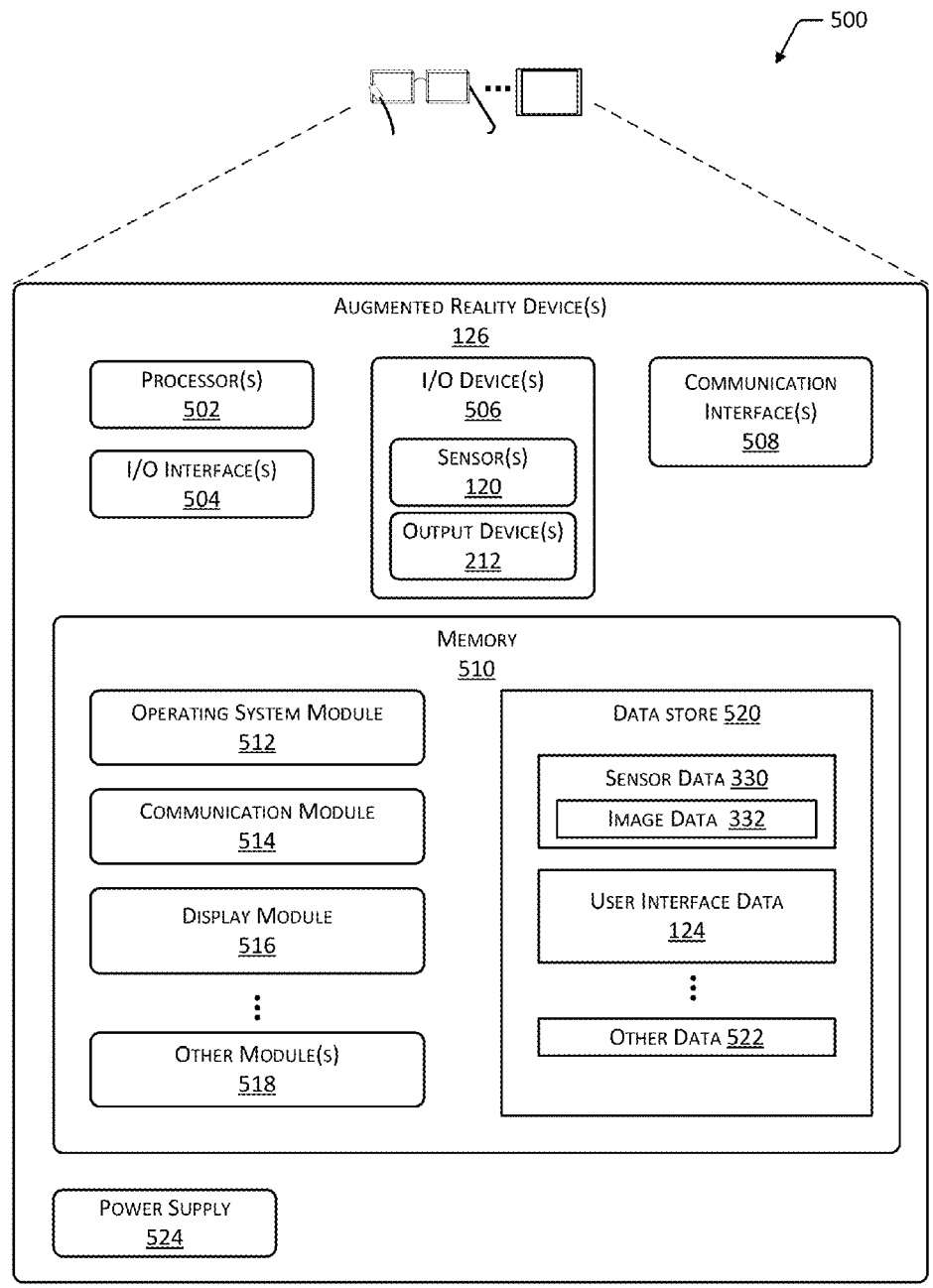
FIG. 5 illustrates an augmented reality device configured to present an AR user interface to a user, according to some implementations.

FIG. 5 illustrates a block diagram 500 of the AR device 126 configured to present an AR user interface 128 to the user 116, according to some implementations. The AR device 126 may comprise a wearable computing device, such as in the form factor of a pair of glasses. The AR device 126 may include one or more hardware processors 502 (processors) configured to execute one or more stored instructions. The processors 502 may comprise one or more cores. The AR device 126 may include one or more I/O interface(s) 504 to allow the processor 502 or other portions of the AR device 126 to communicate with other devices. The I/O interfaces 504 may include I2C, SPI, USB, RS-232, and so forth.

The I/O interface(s) 504 may couple to one or more I/O devices 506. The I/O devices 506 may include one or more of the input devices such as the sensors 120. As described above, the sensors 120 may include imaging sensors 120(1), 3D sensors 120(2), buttons 120(3), touch sensors 120(4), microphones 120(5), light sensors 120(7), RFID readers 120(8), accelerometers 120(10), gyroscopes 120(11), magnetometers 120(12), and so forth.

The I/O devices 506 may also include one or more of haptic output devices 212(1), audio output devices 212(2), display devices 212(3), and so forth. For example, the display devices 212(3) may be configured in a head-mounted display, such that the field of vision of the user 116 includes the display device 212(3) as well as one or more of the real-world objects in the facility 102. In some implementations input and output devices may be combined. In some embodiments, the I/O devices 506 may be physically incorporated with the AR device 126 or may be externally placed.

The AR device 126 may also include one or more communication interfaces 508. The communication interfaces 508 are configured to provide communications between the AR device 126 and other devices, such as other AR devices 126, totes 118, routers, access points 210, the servers 204, and so forth. The communication interfaces 508 may include devices configured to couple to PANs, LANs, WANs, and so forth. For example, the communication interfaces 508 may include devices compatible with Wi-Fi, Bluetooth, ZigBee, and so forth.

The AR device 126 may also include one or more busses or other internal communications hardware or software that allow for the transfer of data between the various modules and components of the AR device 126.

As shown in FIG. 5, the AR device 126 includes one or more memories 510. The memory 510 comprises one or more CRSM as described above. The memory 510 provides storage of computer readable instructions, data structures, program modules and other data for the operation of the AR device 126. A few example functional modules are shown stored in the memory 510, although the same functionality may alternatively be implemented in hardware, firmware, or as a SOC.

The memory 510 may include at least one OS module 512. The OS module 512 is configured to manage hardware resource devices such as the I/O interfaces 504, the I/O devices 506, the communication interfaces 508, and provide various services to applications or modules executing on the processors 502. The OS module 512 may implement a variant of the FreeBSD operating system as promulgated by the FreeBSD Project, other UNIX or UNIX-like variants, a variation of the Linux operating system, such as Android as promulgated by Google, Inc. of Mountain View, Calif. Other OS modules 512 may be used, such as the Windows operating system from Microsoft Corporation of Redmond, Wash., the LynxOS from LynuxWorks of San Jose, Calif., and so forth.

Also stored in the memory 510 may be one or more of the following modules. These modules may be executed as foreground applications, background tasks, daemons, and so forth.

A communication module 514 may be configured to establish communications with one or more of the sensors 120, AR devices 126, the servers 204, or other devices. The communications may be authenticated, encrypted, and so forth.

The memory 510 may include a display module 516. The display module 516 may be configured to parse the user interface data 124 and present the AR user interface 128 using one or more of the output devices 212 which are onboard or communicatively coupled to the AR device 126. For example, the display module 516 may include an HTML rendering engine configured to process the HTML in the user interface data 124. The display module 516 may also be configured to modify the AR user interface 128 based at least in part on sensor data 330 acquired by sensors 120 onboard or communicatively coupled to the AR device 126. For example, the display module 516 may be configured to provide some object recognition and tracking, such that user interface elements presented by the display device 212(3) follow the motion of the tracked object, such as the user 116 which is in the field of view.

Other modules 518 may also be stored within the memory 510. In one implementation, a data handler module may be configured to generate operational data 334 indicative of the user 116, the AR device 126, or another one or more objects in range of the sensors 120 of the AR device 126. For example, the data handler module may be configured to acquire data from one or more speed sensors 120 and provide that sensor data 330 to the operational data module 318 of the server 204.

The other modules 518 may also include a facial detection module which may be configured to determine a presence of a human face within the image data 332 acquired by the onboard imaging sensor 120(1). The image of the face may then be sent to the server 204 for facial recognition to determine who is present in the image.

The memory 510 may also include a data store 520 to store information. The data store 520 may use a flat file, database, linked list, tree, executable code, script, or other data structure to store the information. In some implementations, the data store 520 or a portion of the data store 520 may be distributed across one or more other devices including the servers 204, other AR devices 126, network attached storage devices and so forth.

The data store 520 may store sensor data 330 as acquired from the sensors 120 onboard the AR device 126. For example, the sensor data 330 may include image data 332 acquired for an onboard imaging sensor 120(1) of the AR device 126. The user interface data 124 received by the AR device 126 may also be stored in the data store 520. Other data 522 may also be stored within the data store 520. For example, device configuration settings, user interface preferences, and so forth may also be stored.

The AR device 126 may also include a power supply 524. The power supply 524 is configured to provide electrical power suitable for operating the components in the AR device 126. The power supply 524 may comprise one or more of photovoltaic cells, batteries, wireless power receivers, fuel cells, capacitors, and so forth.

Figure 6:
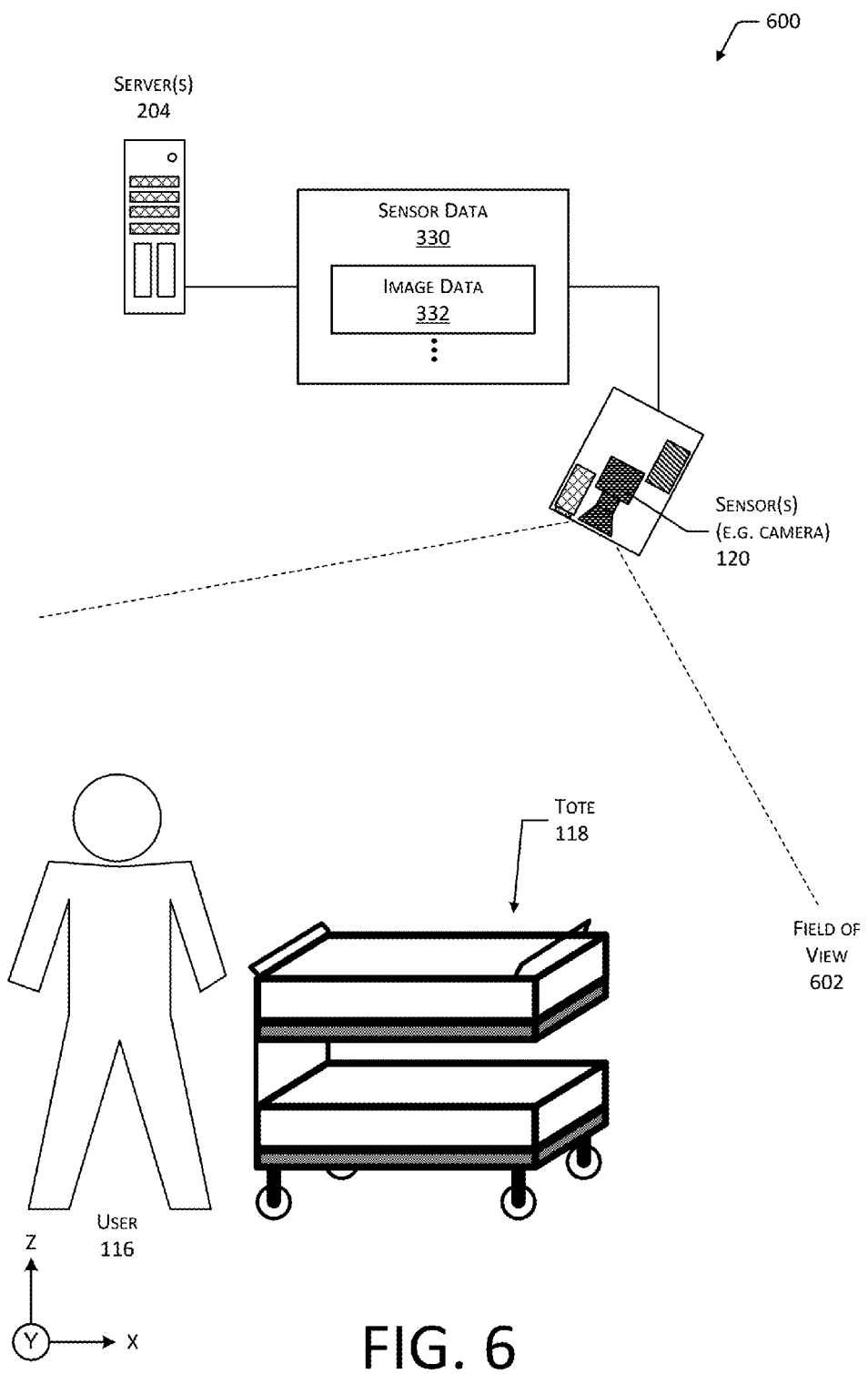
FIG. 6 illustrates an overhead imaging sensor configured to acquire sensor data in the facility, according to some implementations.

FIG. 6 illustrates a side view 600 of an overhead imaging sensor 120(1) acquiring an image of the users 116, the tote 118, and other objects. In some implementations, the facility 102 may include one or more sensors 120 which are configured to acquire an image from an overhead vantage point. The sensors 120 may include, but are not limited to, one or more of the imaging sensors 120(1), the 3D sensors 120(2), the microphones 120(7), the RFID readers 120(9), the RF receivers 120(10), and so forth. The sensors 120 have a field of view 602.

In this illustration, one of the sensors 120 comprises an imaging sensor 120(1) which is configured to generate image data 332. The field of view 602 depicted here includes the user 116 and the tote 118. The image data 332 may be provided to the inventory management system 122. For example, the inventory management module 316 executing on the server 204 may process the image data 332 to determine at least a portion of the operational data 334, such as the location data 344 for the users 116.

Figure 7:
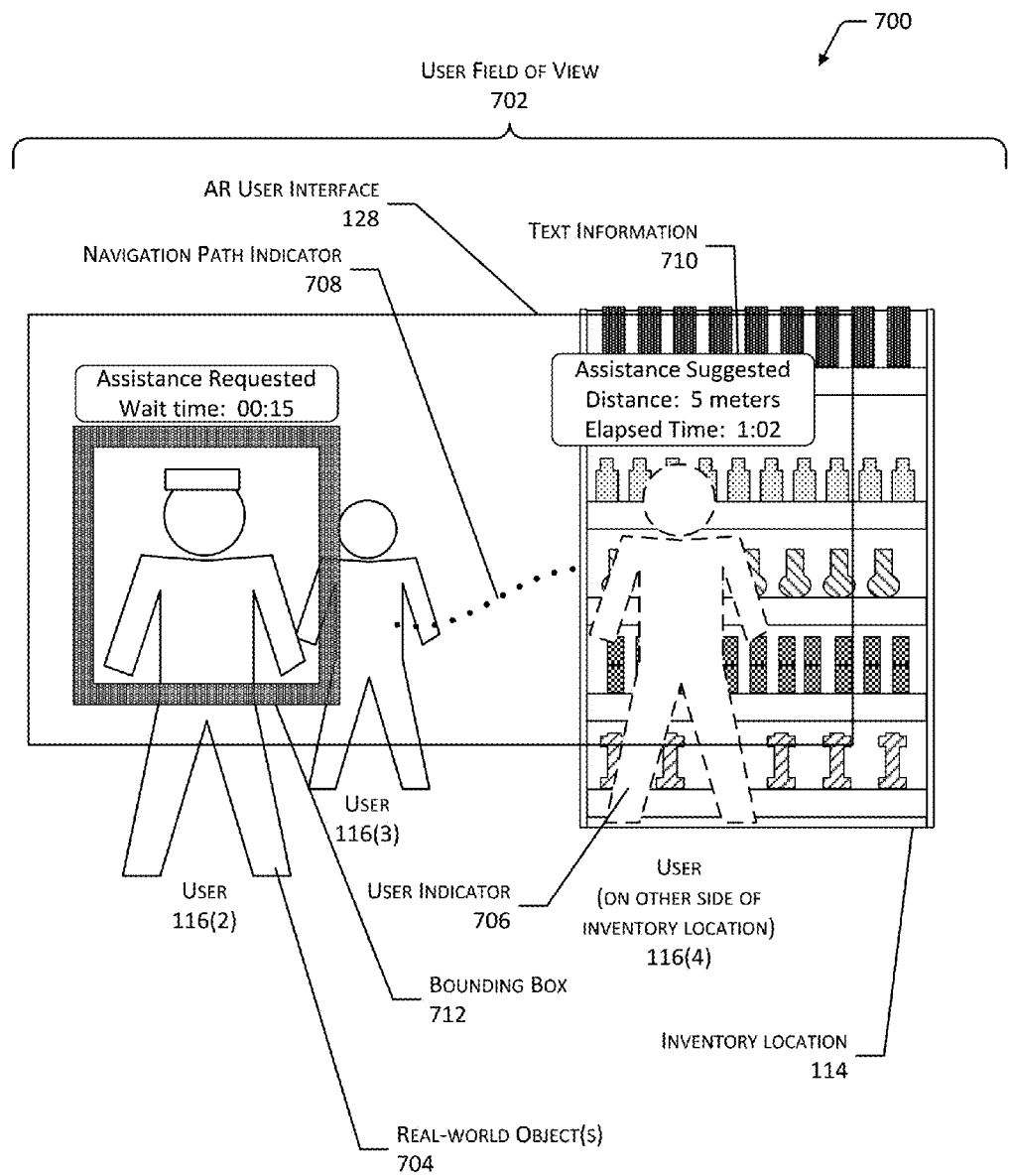
FIG. 7 illustrates an AR user interface, according to some implementations.

FIG. 7 illustrates a scenario 700 including the AR user interface 128, according to some implementations. The AR user interface 128 may be presented at least in part by the AR device 126. The user field of view 702 is depicted in this illustration, such as comprising the combined view from both eyes of the user 116(1). Within or extending beyond the user's 116 field of view 702, the AR user interface 128 is presented. As described above, the AR user interface 128 is configured to present information which may overlay one or more real-world objects 704. The real-world objects 704 depicted here include the users 116(2)-(3), the inventory location 114 comprising shelving holding one or more of the items 104, and so forth.

In some implementations, the AR user interface 128 may be configured to provide representations of real-world objects 704 which are not otherwise visible to the user 116(1). For example, as depicted here the user 116(4) is in an adjacent aisle 112 behind the inventory location 114. The AR user interface 128 may provide visual indicia, such as a user indicator 706, indicating the presence of that user 116. In this way, the operational data 334 may be used to generate user interface data 124 which may be rendered to present the AR user interface 128 which extends the senses and situational awareness of the user 116(1).

A navigation path indicator 708 may provide information based at least in part on the navigation path 350. For example, the navigation path indicator 708 may provide a visual indication as to one or more of the historical, scheduled, or predicted paths within the facility 102 for the particular user 116.

The AR user interface 128 may be configured to present information which appears to be three-dimensional to the user 116. For example, the navigation path 350 may be depicted as appearing to extend away in the distance.

Visible elements such as text information 710 and bounding boxes 712 may also be presented in the AR user interface 128. The text information 710 may be presented as a balloon or dialog box within which textual information is presented. For example, as depicted here text information 710 about the users 116(2) and 116(4) are depicted. The bounding box 712 may comprise a frame or other visual indicator which is used to indicate that a particular object, such as an inventory location 114, user 116, or tote 118 is associated with particular text information 710, or otherwise of interest. For example, the bounding box 712 may provide an indication as to which user 116 assistance has been requested for.

The inventory management system 122 may receive a request for assistance from the user 116, or may automatically generate a request for assistance. As described above, the manual request for assistance may be initiated by the press of a button 120(3), a verbal command, particular gesture, and so forth. The automatic generation of the request for assistance may be based at least in part on analysis of the operational data 334. For example, the user data 340 may include information indicative of the height of the user 116(4). Based at least in part on the height and information indicating that the next item 104 to be picked, inventory management system 122 may determine that the item 104 to be picked is out of reach of the user 116(4). The inventory management system 122 may automatically generate a request for assistance on behalf of the user 116(4) before their arrival at the inventory location 114 holding the item 104. As a result, the user 116(4) receives assistance from the user 116(1) proactively, even while the user 116(4) is out of sight of the user 116(1). In other implementations the request may be generated based on one or more of speech uttered by the user, facial expressions, gestures, and so forth. For example, the user 116(4) uttering an expletive or key phrase such as "where is" or "I don't know", frowning, and so forth may result in the automatic generation of the request.

In some implementations, the AR user interface 128 may also include audible, haptic, or other nonvisual information. For example, the AR device 126 may be configured with stereophonic speakers or earphones such that audible output may be presented to the wearing user 116 such that a particular sound appears to emanate from a particular spatial location.

Figure 8:
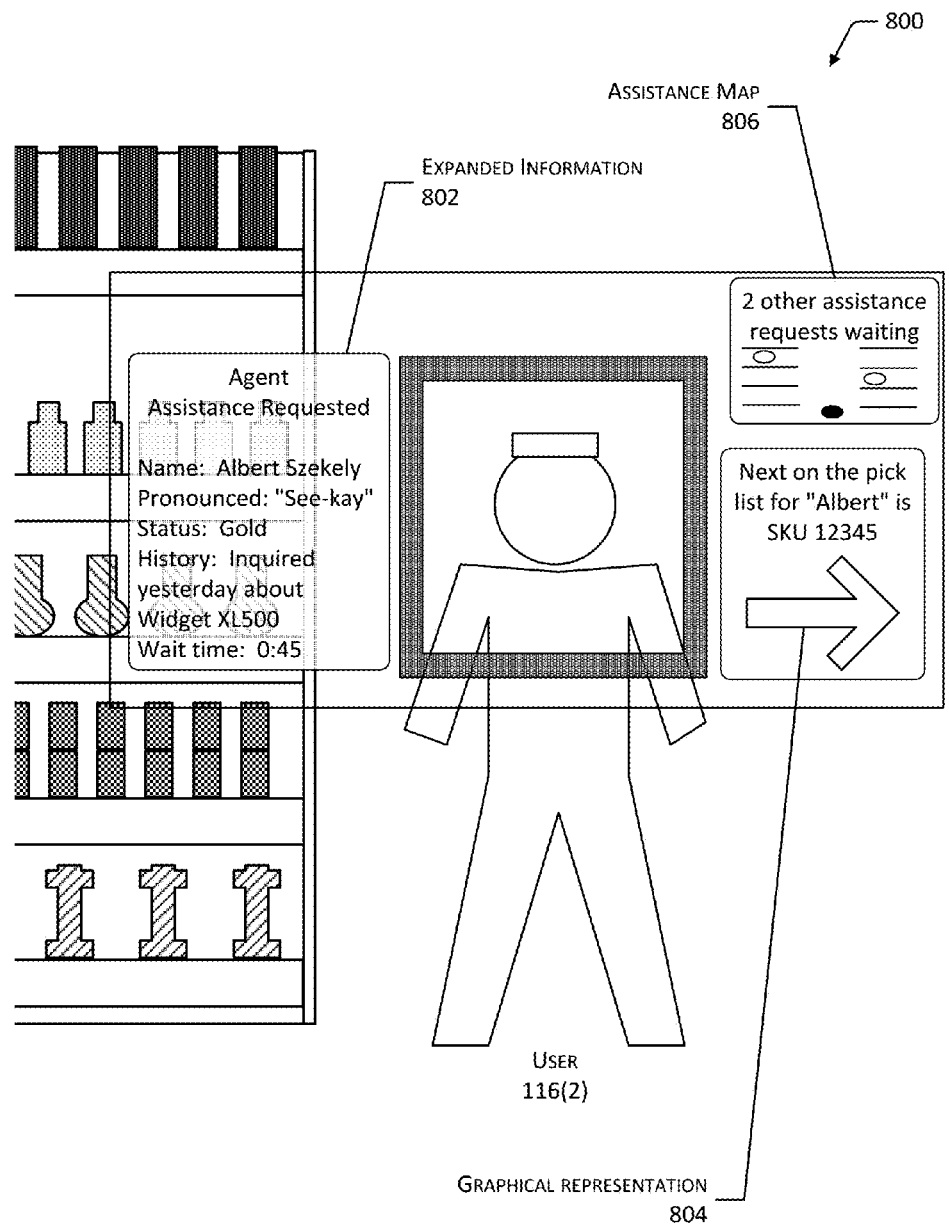
FIG. 8 illustrates an AR user interface presenting detail information associated with another user based at least in part on a distance between, according to some implementations.

FIG. 8 illustrates another scenario 800 of the AR user interface 128 presenting detail information associated with another user 116, according to some implementations. The AR user interface 128 may be presented at least in part by the AR device 126.

The AR user interface 128 may be configured to provide information which assists the user 116(1) wearing the AR device 126 and the performance of their duties within the facility 102. In this scenario, the user 116(1) has approached and is standing in front of the user 116(2). To facilitate the performance of the user's 116(1) job, the inventory management system 122 may be configured to provide the information shown here which is based at least in part on the operational data 334.

Depicted here is an expanded information 802. In this case the expanded information 802 provides information such as assistance was requested, the name and pronunciation of the user 116(2), demographic or other information, and how long the user 116(2) has been waiting for assistance. This information may be used by the user 116(1) to discharge their duties, such as engaging the user 116(2) by using their name and details about recent activities provide in the AR user interface 128 to provide assistance. The AR user interface 128 may also present graphical representations 804. In this illustration, the graphical representation 804 comprises an arrow indicating which direction the next item 104 on the pick list for the user 116(2) may be found.

In addition to the user 116(2) which is immediately before the user 116(1), other information may be presented to maintain overall situational awareness. For example, an assistance map 806 is depicted in the AR user interface 128. The assistance map 806 may provide an abbreviated representation of the user's 116(1) current location within the facility 102 and the locations of others for whom assistance is requested.

In some implementations, the AR user interface 128 may be configured to avoid overlaying information on particular real-world objects 704. For example, overlays may be configured to avoid placement of visual elements on the faces of the closest three users 116 in the field of view 702. In another example, overlays may be configured to avoid placement apparently over an inventory location 114 which is associated with an assistance request or other task to be performed by the user 116(1).

Figure 9:
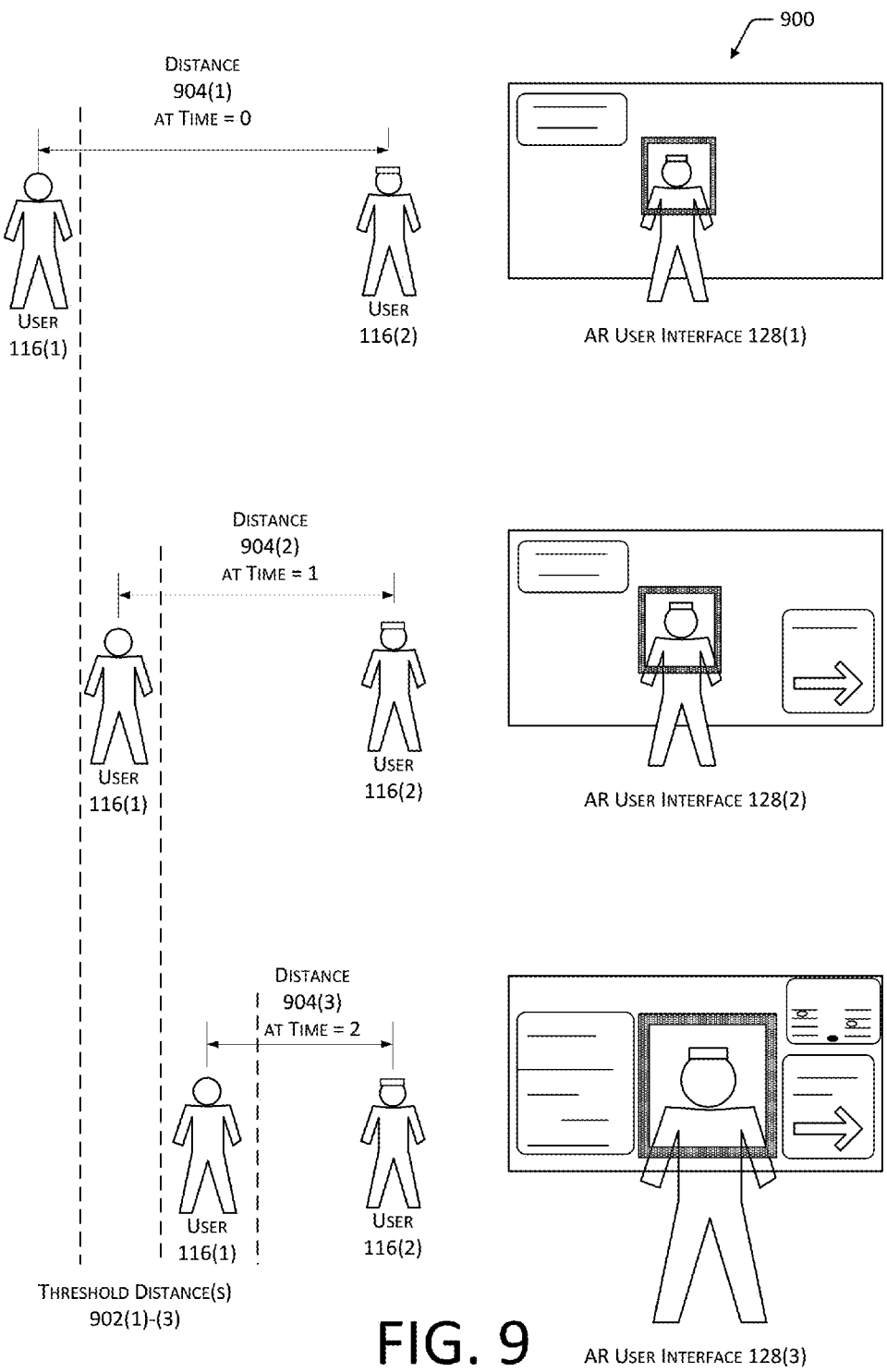
FIG. 9 illustrates a scenario depicting the AR user interface dynamically changing the information presented based on a distance between users, according to some implementations.

FIG. 9 illustrates a scenario 900 depicting the AR user interface 128 presenting detail information associated with another user 116(2) based on a distance between the users 116(1) and 116(2), according to some implementations.

A series of user interfaces 128(1), 128(2), and 128(3) are presented in sequence of increasing time, such that user interface 128(1) is presented before 128(2) and so forth. Also depicted are the user 116(1) who is equipped with the AR device 126 and providing support services and the user 116(2) at successively decreasing relative distance between the two. A series of threshold distances 902(1), 902(2), and 902(3) are also depicted at successively decreasing distances relative to the AR device 126. For example, the threshold distance 902(1) is the farthest while the threshold distance 902(3) is the closest to the user 116(2).

At time=0 and distance 904(1), the user 116(1) is relatively distant from the user 116(2). Based at least in part on this location of the user 116(1) within a threshold distance 902, the user interface module 322 generates the user interface data 124 configured to present the AR user interface 128(1) showing some information, such as the presence of the user 116(2) in that direction.

At time=1 and distance 904(2), the user 116(1) has approached the user 116(2) and is now between the threshold distance 902(1) and 902(2). Based at least in part on this location of the user 116 within a threshold distance 902, the user interface module 322 generates the user interface data 124 configured to present the user interface 128(2) showing additional information, such as depicted above with respect to FIG. 7.

At time=2 and distance 904(3), the user 116(1) has approached still closer to the user 116(2) and is now between the threshold distance 902(2) and 902(3). Based at least in part on this locating, the user interface 128(3) now presents additional information, such as depicted above with respect to FIG. 8.

In some implementations, the size, the area, or both of the user interface elements such as text, graphics, and so forth may be proportionate to or based at least in part on the distance 904. For example, as the user 116(1) approaches the user 116(2), the size of the graphical representation in the AR user interface 128 which is indicative of the user 116(2) may increase.

Illustrative Processes

Figure 10:
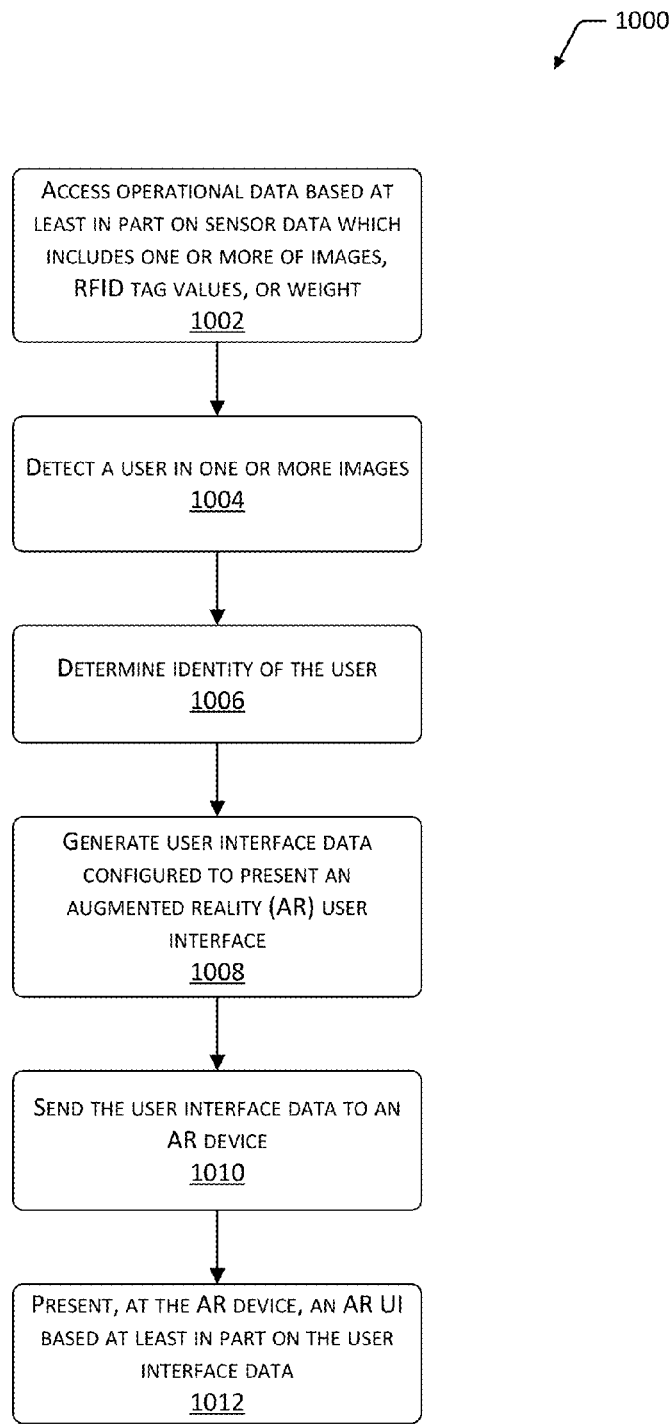
FIG. 10 depicts a flow diagram of a process for presenting an AR user interface providing information about a user, according to some implementations.

FIG. 10 depicts a flow diagram 1000 of a process for presenting an AR user interface 128 providing information about a user 116, according to some implementations. The process may be performed at least in part by one or more of the inventory management module 316, the AR device 126, and so forth.

Block 1002 accesses the operational data 334. The operational data 334 which is derived at least in part from the sensor data 330 from the one or more sensors 120 in the facility 102 may be retrieved from the memory 310. The operational data 334 may be associated with one or more users 116 of the facility 102, such as the user 116(2). As described above, the operational data module 318 may comprise location data 344 indicative of a location of the user 116(2) in the facility 102. The location data 344 may be determined based at least in part on image data 332 which is representative of images acquired from the plurality of imaging sensors 120(1) in the facility 102.

The operational data 334 may also be based at least in part on one or more of weight data acquired by one or more of the weight sensors 120(6), RFID tag data or values as received by one or more of the RFID readers 120(8), and so forth. Based at least in part on the RFID tag data, the identity of the user 116(2) may be determined. For example, the RFID tag data may include a serial number which is used to retrieve an identity record stored in the data store 326. The identity of the user 116(2) may be used to access other information, such as the user data 340. Continuing the example, based on the retrieved identity record, demographic information, pick order information, and so forth may be retrieved and used to generate the user interface data 124. In a further example, the items 104 determined to be in the tote 118 may result in particular user interface data 124 being generated. For example, should a particular item 104 which requires special handling be placed within the tote 118, assistance of the user 116(1) may be summoned.

Access to the operational data 334 may be based at least in part on a determined distance between the user 116(1) and the user 116(2). By limiting access to operational data 334 or portions thereof based on distance, retrieval of the operational data 334 is limited. As a result, access and possible inadvertent dissemination of operational data 334 such as user data 340 may be reduced. In one implementation, the access to the operational data 334 associated with the user 116(2) in the facility 102 is based at least in part on distance between the user 116(1) and the user 116(2). A first set of operational data 334(1) is accessed at a first distance and a second set of operational data 334(2) is accessed at a second distance, wherein the second distance is less than the first distance and the second set of operational data 334(2) contains more information than the first set of operational data 334(1). The corresponding sets of operational data 334(1) and 334(2) may then be presented within the AR user interface 128 as described above with regard to FIG. 9.

Block 1004 detects a user 116 or other person in one or more of the images. For example, an object recognition module may be configured to detect presence of a human form in the image data 332.

Block 1006 determines an identity of the user 116 which was detected in the one or more images. The determination of the identity may be based at least in part on one or more of: facial recognition, clothing recognition, gait recognition, or other characteristics of the person.

Facial recognition may include analyzing facial characteristics which are indicative of one or more facial features in an image, three-dimensional data, or both. The facial features include measurements of, or comparisons between, facial fiducials or ordinal points. The facial features may include eyes, mouth, lips, nose, chin, ears, face width, skin texture, three-dimensional shape of the face, presence of eyeglasses, and so forth. In some implementations the facial characteristics may include facial metrics. The facial metrics indicate various ratios of relative sizes and spacing of the facial features. For example, the facial metrics may include ratio of interpupillary distance to facial width, ratio of eye width to nose width, and so forth. In some implementations the facial characteristics may comprise a set of eigenvectors by using principal component analysis (PCA) on a set of images. These eigenvectors as descriptive of a human face may be known as "eigenfaces" or "eigenimages". In one implementation the facial recognition described in this disclosure may be performed at least in part using one or more tools available in the OpenCV library as developed by Intel Corporation of Santa Clara, Calif., Willow Garage of Menlo Park, Calif., and Itseez of Nizhny Novgorod, Russia, with information available at www.opencv.org. In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity. The facial characteristics may be used to identify the user 116, or to distinguish one user 116 from another.

Clothing recognition analyzes images to determine what articles of clothing, ornamentation, and so forth the user 116 is wearing or carrying. Skin and hair detection algorithms may be used to classify portions of the image which are associated with the user's 116 skin or hair. Items which are not skin and hair may be classified into various types of articles of clothing such as shirts, hats, pants, bags, and so forth. The articles of clothing may be classified according to function, position, manufacturer, and so forth. Classification may be based on clothing color, texture, shape, position on the user 116, and so forth. For example, classification may designate an article of clothing worn on the torso as a "blouse" while color or pattern information may be used to determine a particular designer or manufacturer. The determination of the article of clothing may use a comparison of information from the images with previously stored data. Continuing the example, the pattern of the blouse may have been previously stored along with information indicative of the designer or manufacturer.

In some implementations, identification of the user 116 may be based on the particular combination of classified articles of clothing. For example, the user 116(2) may be distinguished from the user 116(3) based at least in part on the user 116(2) wearing a hat and a red shirt while the user 116(3) is not wearing a hat and is wearing a blue shirt. The clothing may be used to identify the user 116, or distinguish one user 116 from another.

Gait recognition analyzes images, three-dimensional data, or both to assess how a user 116 moves over time. Gait comprises a recognizable pattern of movement of the user's 116 body which is affected by height, age, and other factors. Gait recognition may analyze the relative position and motion of limbs of the user 116. Limbs may include one or more arms, legs, and in some implementations head. In one implementation edge detection techniques may be used to extract a position of one or more limbs of the user 116 in the series of images. For example, a main leg angle of a user's 116 leg may be determined, and based on the measurement of this main leg angle over time and from different points-of-view, a three-dimensional model of the leg motion may be generated. The change in position over time of the limbs may be determined and compared with previously stored information to determine an identity of the user 116, or distinguish one user 116 from another.

In some implementations identity may be based on a combination of these or other recognition techniques. For example, the user 116 may be identified based on clothing recognition, gait recognition, and facial recognition. The different recognition techniques may be used in different situations, or in succession. For example, clothing recognition and gait recognition may be used at greater distances between the user 116 and the imaging sensors 120(1) or when the user's 116 face is obscured from view by the imaging sensor 120(1). In comparison, as the user 116 approaches the imaging sensor 120(1) and their face is visible, facial recognition may be used. Once identified, such as by way of facial recognition, one or more of gait recognition or clothing recognition may be used to track the user 116 within the facility 102.

In other implementations other techniques for facial recognition, clothing recognition, gait recognition, and so forth may be employed. For example, facial recognition may use iris detection and recognition, clothing recognition may use embedded RF tags, gait recognition may utilize data from weight sensors 120(6), and so forth.

Block 1008 generates user interface data 124 configured to present an AR user interface 128 using the AR device 126. For example, the user interface data 124 may comprise instructions such as markup language tags which describe the elements of the AR user interface 128. In some implementations, the AR device 126 may be a wearable computing device, such as a unit in which the display device 212(3) is worn as a pair of glasses or a monocle. As described above, in some implementations the user interface data 124 may be based at least in part on, or inclusive of, the operational data 334. For example, the user interface data 124 may be indicative of one or more of: a distance between the user 116(1) and the user 116(2), a pick status of an order being picked by the user 116(2), a total value or quantity of items picked by the user 116(2), a pending request for assistance by the user 116(2), an elapsed time since initiation of a request for assistance by the user 116(2), an identification error of an item picked by the user 116(2), an inventory level of one or more items, facility data 336, or deviation from a navigation path of the user 116(2) through the facility. Continuing the example, the user interface data 124 may present facility data 336 indicating that a particular inventory location 114 requires restocking.

As described, in some implementations access to the operational data 334 which is associated with the user 116(2) in the facility 102 may be based at least in part on the identity of the user 116(2). For example, the user 116(2) may have defined a user preference which prevents their name from being presented in the AR user interface 128 of other users 116.

In some implementations, to enable the user 116(1) to more readily identify the user 116(2), a portion of the image data 332 which includes a depiction of the face of the user 116(2) may be extracted from the image data 332 and included in the user interface data 124. For example, when summoned by the user 116(2) to provide assistance, the user 116(1) may see in the AR user interface 128 a headshot of the user 116(2) acquired at the time a request for assistance was entered. In this way, the user 116(1) is able to see whom to respond to.

Block 1010 sends the user interface data 124 to the AR device 126. For example, the server 204 may use the communication interface 308 to wirelessly send user interface data 124 to the wearable computing device of the user 116(1). As described above, the operational data 334 may change from a first time to a second time. For example, the first set of operational data 334(1) which is associated with the first time may differ from the second set of operational data 334(2) which is associated with the second time. The user interface data 124 may also change from the first time to the second time, responsive to the changes in the operational data 334.

Block 1012 presents, at the AR device 126, an AR user interface 128 based at least in part on the user interface data 124. In some implementations the AR user interface 128 may include one or more elements which are generated locally on the AR device 126. For example, the display module 516 of the AR device 126 may be configured to present a battery power indicator within the AR user interface 128.

Figure 11:
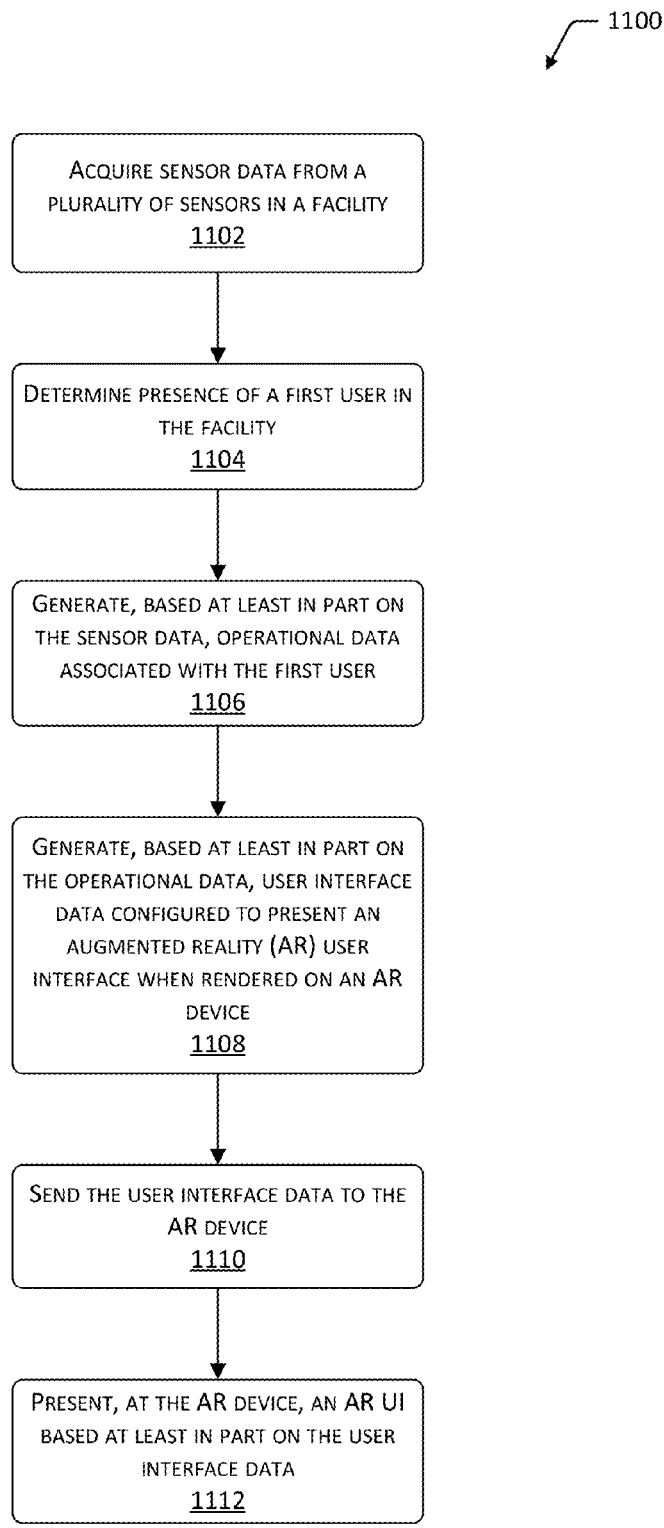
FIG. 11 depicts a flow diagram of a process for presenting an AR user interface including operational data about a facility, according to some implementations.

FIG. 11 depicts a flow diagram 1100 of a process for presenting the AR user interface 128 including operational data 334 about the facility 102, according to some implementations. The process may be performed at least in part by one or more of the inventory management module 316, the AR device 126, and so forth.

Block 1102 acquires sensor data 330 from a plurality of sensors 120. For example, the sensor data 330 may be received from the sensors 120 by way of one or more of the communication interfaces 308.

Block 1104 determines presence of the user 116(2) in the facility 102. In one implementation, the determination of the presence of the user 116(2) in the facility 102 may include scanning the user 116(2) at an entry portal for one or more machine readable tags. For example, the tags may include one or more of a RF tag 206, an optical tag, or a magnetic tag. The scanning may include interrogating with an RF signal 208, acquiring images from image sensors 120(1), or otherwise acquiring sensor data 330 and processing the sensor data 330 to determine that a user 116 is there. In another example, the presence may be determined by information from a proximity sensor that detects the user 116(2) is somewhere in the facility 102 or has crossed a threshold in the entry portal, but may not necessarily provide detail such as the location of the user 116(2). In some implementations, the identity of the user 116(2) may also be determined based at least in part on this information obtained from the tags.

Block 1106 generates, based at least in part on the sensor data 330, operational data 334 associated with the user 116(2). In one implementation, based at least in part on the image data 332, the operational data module 318 may determine the location data 344 for the user 116(1) and 116(2), and determine a distance between the two. In some implementations, the operational data 334 may be retrieved from storage. For example, the user data 340 may be previously stored in the data store 326.

In one implementation, the operational data 334 associated with the user 116(2) in the facility 102 is based at least in part on the identity of the user 116(2) and the access permissions 352 of the user 116(1). For example, where the user 116(1) is a supervisor, the access permissions 352 may permit that user 116(1) to see operational data 334 in the user interface data 124 about the user 116(2). The access permissions 352 may be configured to designate specific information as accessible or inaccessible to other users 116. For example, the access permissions 352 may prohibit the user 116(1) from seeing operational data 334 in the user interface data 124 about more senior users 116(4) such as an executive or owner.

The access permissions 352 may also be associated with one or more of the user 116(1), the user 116(2), or other users 116(U). For example, the user 116(2) may have access permissions 352 which specify particular information which may or may not be shared with others. Continuing the example, the user 116(2) may specify an access permission 352 allowing others (such as the user 116(1)) to see information about a disability, need for an interpreter, and so forth. This permission may be to a particular user 116, group of users, and so forth. Thus, the user 116 may specify how and what information is to be included in the user interface data 124. For example, the access permissions 352 may specify particular information of the user 116(2) is accessible or inaccessible. Accessible information may be included in the user interface data 124 and thus may be presented in the AR user interface 128, while inaccessible information may be omitted from the user interface data 124 and thus is not presented in the AR user interface 128.

The identity of the user 116(2) may be determined based at least in part on facial recognition, clothing recognition, gait recognition, or a combination thereof. The user 116(2) may be detected within one or more of the images of the image data 332. For example, an object recognition module may recognize the presence of a person in the image data 332, and then compare the results of that recognition with previously stored data to determine the identity.

As described above, the operational data 334 may include relationship data 346. As described above, the relationship data 346 provides information indicative a relationship between the user 116(2) and one or more additional users 116 in or associated with the facility 102. In one implementation the relationship data 346 may be generated based at least in part on determining one or more additional users 116 entered or exited the facility with the user 116(2), and inferring that an association exists because of this common entrance. For example, the users 116(2) and 116(3) may be determined to have a relationship after arriving at the facility 102 together over the course of several visits. In another implementation, the relationship data 346 may be manually entered or acquired from another system.

As also described above, the operational data 334 may also comprise facility data 336. The facility data 336 comprises information indicative of operation of the facility 102. The facility data 102 may include at least one or more of: an emergency exit location, an evacuation path, an alarm status, equipment status, and so forth. For example, the facility data 102 may include information indicating the fire alarm is in progress and indicating emergency exits located away from the location of the fire.

The operational data 334 may also include user data 340 which may be specific to a particular user 116 or group of users. For example, the operational data 334 may be specific to the user 116(1). The user data 340 may include at least one or more of: a message 348, a task list, a navigation path 350, and so forth. For example, a task list may comprise information indicating jobs which are to be done within the facility 102 which has been assigned to the user 116(1).

Block 1108 generates, based at least in part on the operational data 334, user interface data 124 configured to present an AR user interface 128 when rendered on an AR device 126 used by the user 116(1). For example, the user interface data 124 may comprise instructions such as markup language tags which describe the elements of the AR user interface 128. In one implementation, the user interface data 124 may include the operational data 334 indicative of the distance between the user 116(1) and the user 116(2). The distance may be one or more of a straight-line distance, a travel path distance, and so forth. In another implementation, the user interface data 124 comprises operational data 334 indicative of a request for assistance associated with the user 116(2).

Block 1110 sends the user interface data 124 to the AR device 126. For example, the server 204 may use the communication interface 308 to wirelessly send user interface data 124 to the wearable computing device of the user 116(1). As described above, the wearable computing device may include a display device 212(3) configured to be worn on the user's 116(1) head and render the AR user interface 128 within the user's 116(1) field of view 702.

Block 1112 presents, at the AR device 126, an AR user interface 128 based at least in part on the user interface data 124. In some implementations the AR user interface 128 may include one or more elements which are generated locally on the AR device 126. As described above, the AR user interface 128 may include one or more of graphical representations 804 or text information 710 presented as overlaying real-world objects 704 within a field of view 702 of the user 116(1). The graphical representations 804 or text information 710 are indicative of, or based at least in part on, the operational data 334. Continuing the example of block 1108, the AR user interface 128 may present text information indicating the distance to the requesting user 116, an icon indicating a request for assistance, and so forth.

Figure 12:
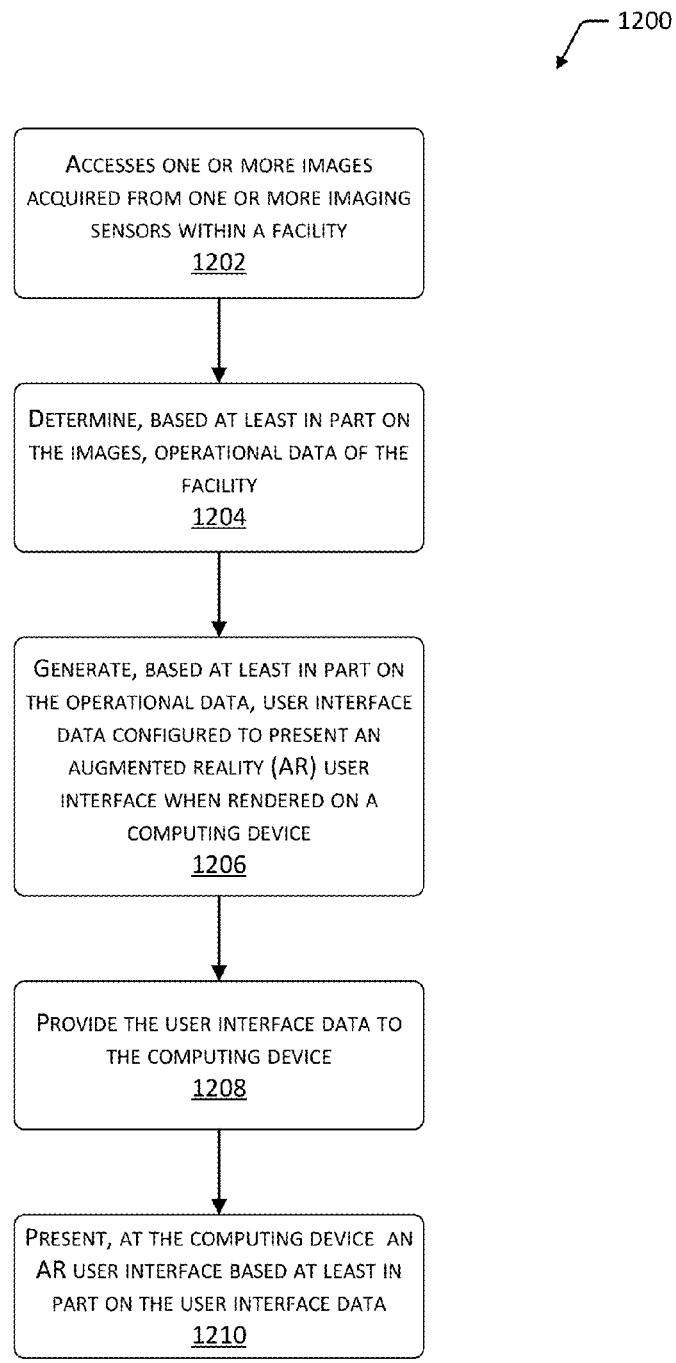
FIG. 12 depicts a flow diagram of another process for presenting an AR user interface, according to some implementations.

FIG. 12 depicts a flow diagram 1200 of another process for presenting the AR user interface 128, according to some implementations. The process may be performed at least in part by one or more of the inventory management module 316, the AR device 126, and so forth.

Block 1202 accesses one or more images in image data 332 acquired from one or more imaging sensors 120(1) within the facility 102. Sensors 120 other than the imaging sensors 120(1) may also acquire sensor data 330. For example, the weight sensors 120(6) may be configured to generate weight data.

Block 1204 determines, based at least in part on the images, operational data 334 of the facility 102. For example, the operational data module 318 may generate location data 344 of one or more users 116, distance between the locations of the users 116, relationship data 346, navigation path 350, a request for assistance, inventory level of an item 104, and so forth based at least in part on the images. Continuing the example, the operational data module 318 may recognize the user 116(2) holding up their hand in a particular gesture which may be used to summon assistance of the user 116(1).

Block 1206 generates user interface data 124 configured to present an AR user interface 128 on a computing device, such as the AR device 126. For example, the user interface data 124 may comprise instructions such as markup language tags which describe the elements of the AR user interface 128. As described above, the AR user interface 128 presents information based at least in part on the operational data 334 of the facility 102. The operational data 334 may include user data 340 associated with one or more of the users 116 of the facility 102.

Block 1208 provides the user interface data 124 to the AR device 126 using the communication interface 308. The AR device 126 receives, at the communication interface 308, the user interface data 124.

Block 1210 presents, at the AR device 126, an AR user interface 128 based at least in part on the user interface data 124. For example, the AR user interface 128 may be displayed on a head-mounted display device 212(3). In some implementations the AR user interface 128 may include one or more elements which are generated locally on the AR device 126.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a wearable computing device comprising a head-mounted display device configured to present visual information to a first user in a materials handling facility (facility);
a plurality of cameras external to the wearable computing device and configured to acquire images within the facility;
a wireless interface configured to communicate with the wearable computing device;
a memory, storing computer-executable instructions; and
a hardware processor in communication with the plurality of cameras, the wireless interface, and the memory, wherein the hardware processor is configured to execute the computer-executable instructions to:
access operational data stored in the memory that is associated with a second user in the facility, wherein the operational data is determined using image data acquired from the images, wherein the operational data comprises information related to a request for assistance submitted by the second user and relationship data indicative of a relationship between the second user and a third user existing prior to the second user submitting the request for assistance;
generate, using the hardware processor, user interface data configured to present a user interface using the head-mounted display device, wherein the user interface data is indicative of the operational data associated with the second user; and
send, using the wireless interface, the user interface data to the wearable computing device, wherein the user interface based on the user interface data is presented to the first user to indicate the request for assistance by the second user and the relationship between the second user and the third user.

2. The system of claim 1, wherein the hardware processor is further configured to execute the computer-executable instructions to:

detect the second user in one or more of the images;
analyze the one or more of the images to determine an identity of the second user using one or more of:
  facial recognition comprising:
    detection of a face of the second user in the one or more images,
    calculation of one or more eigenvectors of the face of the second user, and
    comparison of the one or more eigenvectors with previously stored data;
  clothing recognition comprising:
    detection of one or more articles of clothing of the second user in the one or more images,
    classification of the one or more articles of clothing of the second user, and
    comparison of the classification of the one or more articles of clothing of the second user with the previously stored data; or
  gait recognition comprising:
    determination of one or more limbs of the second user in the one or more images,
    determination of a change in position over time of the one or more limbs of the second user, and
    comparison of the change in position over time with the previously stored data;
retrieve the operational data using the identity of the second user; and
present, in the user interface, a portion of the one or more of the images depicting the face of the second user.

3. The system of claim 1, further comprising:
a radio frequency identification (RFID) reader in communication with the hardware processor, the RFID reader configured to retrieve a value of a radio frequency (RF) tag;
a weight sensor in communication with the hardware processor, the weight sensor configured to determine a weight of a tote; and
wherein the hardware processor is further configured to execute the computer-executable instructions to:
  receive RFID tag data indicative of a RFID tag associated with the second user;
  determine an identity of the second user using the RFID tag data;
  based at least in part on the weight of the tote, determine one or more items in the tote; and
  wherein at least a portion of the operational data associated with the second user in the facility is generated using the identity of the second user and the one or more items in the tote.

4. The system of claim 1, wherein the hardware processor is further configured to execute the computer-executable instructions to:
access a first set of operational data when the first user and the second user are at a first distance from one another;
access a second set of operational data when the first user and the second user are at a second distance from one another, further wherein the second distance is less than the first distance and the second set of operational data comprises more information than the first set of operational data; and
wherein the user interface data changes from a first time using the first set of operational data to a second time using the second set of operational data.

5. A system comprising:
a wearable computing device configured to present visual information to a first user;
a plurality of cameras external to the wearable computing device configured to acquire images within a materials handling facility (facility);
a communication interface configured to communicate with the wearable computing device;
a memory, storing computer-executable instructions; and
a hardware processor in communication with the plurality of cameras, the communication interface, and the memory, wherein the hardware processor is configured to execute the computer-executable instructions to:
  access, from the memory, the images;
  based at least in part on the images, determine operational data of the facility using the hardware processor, wherein the operational data comprises information related to a request for assistance submitted by a second user and relationship data indicative of a pre-existing relationship between the second user and a third user;
  generate, using the hardware processor, user interface data comprising one or more instructions to present a user interface on the wearable computing device at the facility, wherein the user interface presents information based at least in part on the operational data of the facility as an overlay on real-world objects; and
  send the user interface data to the wearable computing device using the communication interface, wherein the user interface based on the user interface data is presented to the first user to indicate the request for assistance by the second user and the pre-existing relationship between the second user and the third user.

6. The system of claim 5, the hardware processor further configured to execute the computer-executable instructions to:
access user data associated with one or more users of the facility; and
wherein the user interface presents information based at least in part on the user data.

7. The system of claim 5, wherein the operational data comprises at least one or more of:
a distance between a location of the first user and a location of the second user,
the request for assistance associated with the second user,
an inventory location of an inventory item, or
an inventory level of an item.

8. The system of claim 5, wherein the wearable computing device comprises:
a second communication interface configured to communicate with the communication interface;
a head-mounted display device;
a second memory, storing second computer-executable instructions; and
a second hardware processor in communication with the second communication interface, the head-mounted display device, and the second memory, wherein the second hardware processor is configured to execute the second computer-executable instructions to:
  receive the user interface data using the second communication interface; and
  present, based at least in part on the user interface data, the user interface using the head-mounted display device, wherein the user interface comprises one or more of graphical representations or text presented as overlaying the real-world objects within a field of view.

9. The system of claim 5, further comprising:
a second plurality of sensors configured to acquire sensor data associated with operation of the facility; and
wherein the determination of the operational data is based at least in part on the sensor data.

10. The system of claim 1, wherein the information related to the request for assistance submitted by the second user comprises information regarding one or more items selected for purchase by at least one of the second user or the third user.

11. The system of claim 1, wherein the hardware processor is further configured to execute the computer-executable instructions to:
retrieve the relationship data indicative of the relationship between the second user and the third user; and
wherein the relationship data is used to prevent the second user and the third user from crosschecking a pick of an item.

12. The system of claim 1, wherein the hardware processor is further configured to execute the computer-executable instructions to:
retrieve access permission data associated with the first user, wherein the access permission data specifies one or more of information accessible to or inaccessible to the first user; and
generate the operational data based on the access permission data of the first user to include information accessible to the first user in the user interface data and omit from the user interface data information inaccessible to the first user.

13. The system of claim 1, wherein the hardware processor is further configured to execute the computer-executable instructions to:
detect the second user in one or more of the images acquired within the facility; and
determine an identity of the second user using at least one or more of:
facial recognition,
clothing recognition, or
gait recognition; and
wherein the operational data includes the identity of the second user.

14. The system of claim 1, wherein the operational data is indicative of one or more of:
a distance between the first user and the second user,
a pick status of an order being picked by the second user,
a total value or quantity of items picked by the second user,
an elapsed time since initiation of the request for assistance by the second user, or
deviation from a navigation path of the second user through the facility.

15. A method comprising:
presenting visual information to a first user using a wearable computing device at a materials handling facility (facility);
acquiring, at the facility, sensor data from a plurality of sensors, wherein the plurality of sensors are separate from the wearable computing device;
determining presence of a second user in the facility;
generating, using at least the sensor data, operational data associated with the second user, wherein the operational data comprises information related to a request for assistance submitted by the second user and relationship data indicative of a relationship between the second user and a third user; and
generating, using at least the operational data, user interface data comprising one or more instructions to present a user interface with the wearable computing device worn by the first user, wherein the user interface comprises one or more elements which overlay real-world objects, and wherein the user interface based on the user interface data is presented to the first user to indicate the request for assistance by the second user and the relationship between the second user and the third user.

16. The method of claim 15, further comprising:
retrieving facility data indicative of operation of the facility, the facility data including at least one or more of:
emergency exit location,
evacuation path,
alarm status, or
equipment status; and
generating the user interface data based on the facility data.

17. The method of claim 15, further comprising:
retrieving data associated with the first user, wherein the data associated with the first user comprises one or more of:
a message,
a task list, or
a navigation path; and
generating the user interface data based at least in part on the data associated with the first user.

18. The method of claim 15, further comprising:
scanning the second user at an entry portal for one or more machine readable tags, wherein the one or more machine readable tags comprise one or more of a radio frequency identification tag, an optical tag, or a magnetic tag.

19. The method of claim 15, wherein the operational data comprises information indicative of a distance between the first user and the second user, and further wherein the distance is one or more of a straight-line distance or a travel path distance.

20. The method of claim 15, further comprising:
determining that the third user entered the facility with the second user, based on one or more of:
analyzing second sensor data comprising images acquired at an entry portal of the facility to determine the second user was proximate to the third user at the entry portal; or
analyzing third sensor data comprising tag data received from scanning tags at the entry portal to determine a tag associated with the second user was scanned at the entry portal of the facility within a threshold time of tags associated with the third user; and
generating the relationship data.

21. A method comprising:
receiving user interface data at a wearable computing device worn by a first user at a materials facility using a communication interface; and
presenting a user interface to the first user on a display device of the wearable computing device, wherein
the user interface is presented using the user interface data,
the user interface is indicative of a request for assistance submitted by a second user and relationship data between the second user and a third user, and the user interface presents one or more elements as graphical representation or text overlaid on real-world objects within a field of view.

* * * * *